United States Patent
Kawachi et al.

(10) Patent No.: US 10,121,516 B2
(45) Date of Patent: Nov. 6, 2018

(54) DATA MONITORING AND MANAGEMENT DEVICE AND EVENT DATA MONITORING METHOD

(71) Applicant: TOSHIBA VISUAL SOLUTIONS CORPORATION, Misawa-shi, Aomori (JP)

(72) Inventors: Reiko Kawachi, Nishitama Tokyo (JP); Hidehito Izawa, Hanno Saitama (JP); Kunio Honsawa, Ome Tokyo (JP); Hiroyuki Nomoto, Sayama Saitama (JP)

(73) Assignee: Toshiba Visual Solutions Corporation (JP)

( * ) Notice: Subject to any disclaimer, the term of this patent is extended or adjusted under 35 U.S.C. 154(b) by 0 days.

(21) Appl. No.: 15/445,856

(22) Filed: Feb. 28, 2017

(65) Prior Publication Data

US 2018/0102145 A1  Apr. 12, 2018

(30) Foreign Application Priority Data

Oct. 12, 2016  (JP) .................................. 2016-200993

(51) Int. Cl.
*H04N 5/77* (2006.01)
*G11B 27/34* (2006.01)
*G11B 27/00* (2006.01)
*G08B 13/196* (2006.01)

(52) U.S. Cl.
CPC ........ *G11B 27/34* (2013.01); *G08B 13/19671* (2013.01); *G08B 13/19684* (2013.01); *G11B 27/005* (2013.01)

(58) Field of Classification Search
CPC .............................. G11B 27/34; G11B 27/005
USPC ................ 386/228, 248, 326, 230, 239, 243
See application file for complete search history.

(56) References Cited

U.S. PATENT DOCUMENTS

| | | | |
|---|---|---|---|
| 6,163,257 A | 12/2000 | Tracy | |
| 6,400,265 B1 | 6/2002 | Saylor et al. | |
| 6,987,528 B1 | 1/2006 | Nagahisa et al. | |
| 7,512,289 B2 * | 3/2009 | Scheier | G06F 3/002 |
| | | | 382/305 |
| 2014/0055612 A1 | 2/2014 | Hinkel | |
| 2014/0195952 A1 | 7/2014 | Champagne et al. | |
| 2015/0049189 A1 | 2/2015 | Yau et al. | |
| 2015/0106721 A1 | 4/2015 | Cha et al. | |
| 2015/0294542 A1 | 10/2015 | Wada et al. | |
| 2015/0350611 A1 | 12/2015 | Pearson et al. | |

(Continued)

FOREIGN PATENT DOCUMENTS

| | | |
|---|---|---|
| EP | 1533768 A1 | 5/2005 |
| JP | 2000-295572 A | 10/2000 |

(Continued)

*Primary Examiner* — Robert Chevalier
(74) *Attorney, Agent, or Firm* — Rutan & Tucker, LLP

(57) ABSTRACT

According to one embodiment, a device includes an instruction unit which records in a recording medium, event-related data of when an event is detected and monitoring data of when the event occurs, and a display data output unit which outputs from the recording medium and plays as display data, the event-related data and a part of the monitoring data corresponding to the event-related data. If there is a specification input to the displayed event-related data, the monitoring data corresponding to the event-related data is played.

20 Claims, 20 Drawing Sheets

(56) References Cited

U.S. PATENT DOCUMENTS

2016/0148492 A1  5/2016  Wada et al.
2017/0228960 A1* 8/2017  Nguyen ................ G07F 17/322

FOREIGN PATENT DOCUMENTS

| JP | 2000-339923 A | 12/2000 |
| JP | 2002-135762 A | 5/2002 |
| JP | 2002-152721 A | 5/2002 |
| JP | 2004-135202 A | 4/2004 |
| JP | 2004-295408 A | 10/2004 |
| JP | 2015-201088 A | 11/2015 |
| JP | 2016-100791 A | 5/2016 |

* cited by examiner

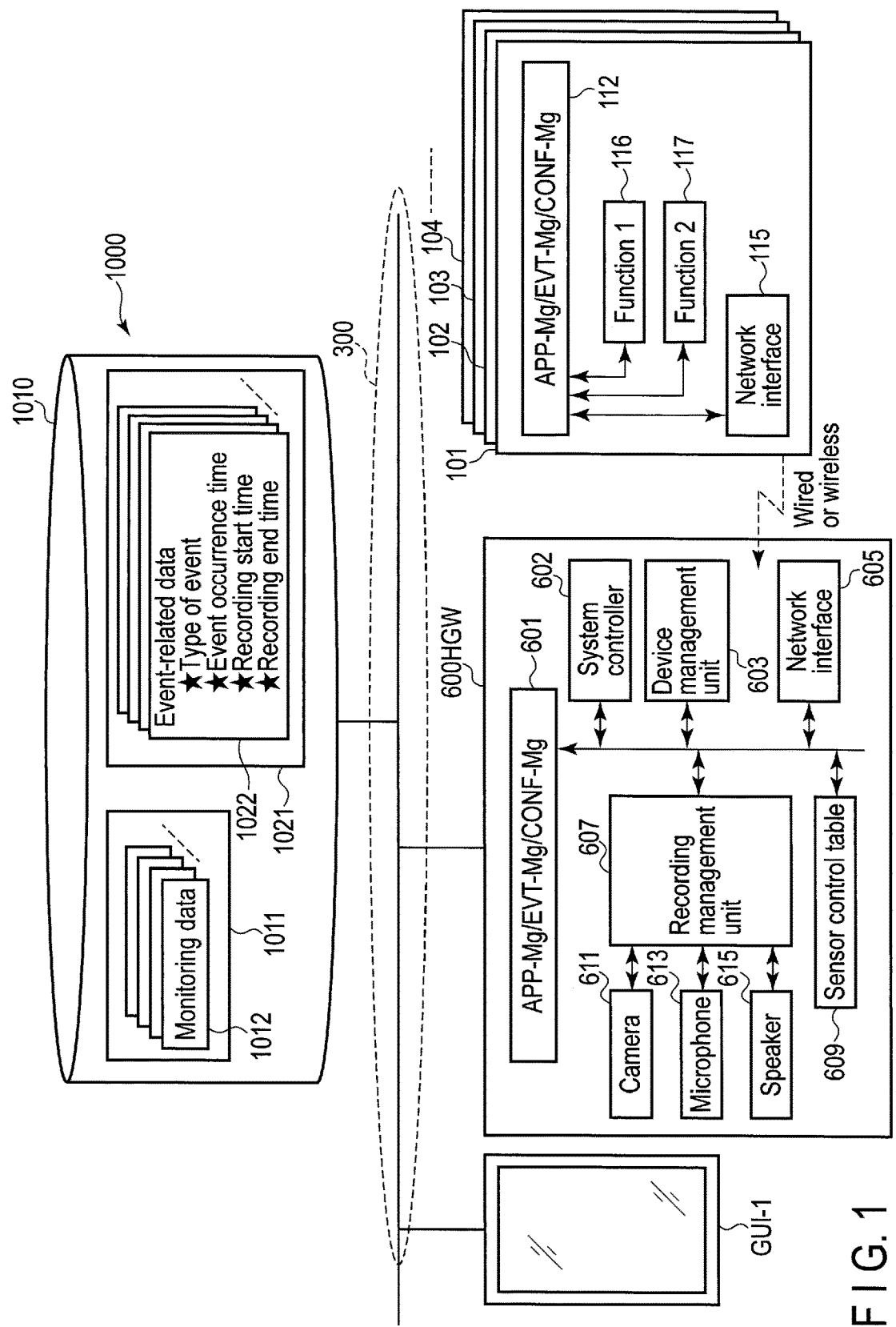
F I G. 1

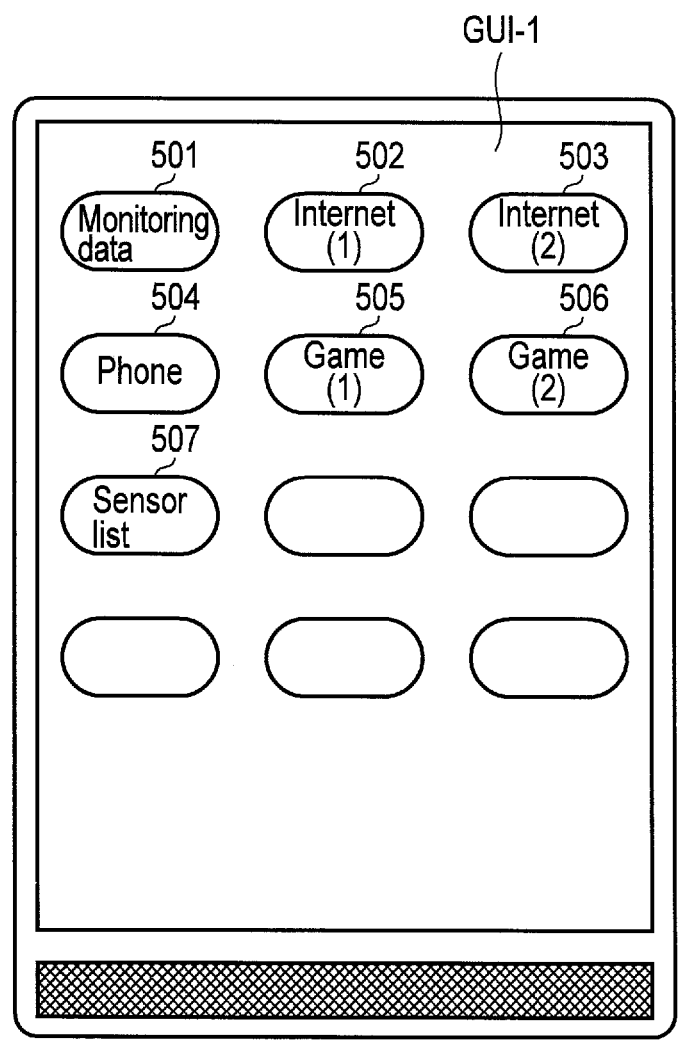
F I G. 4

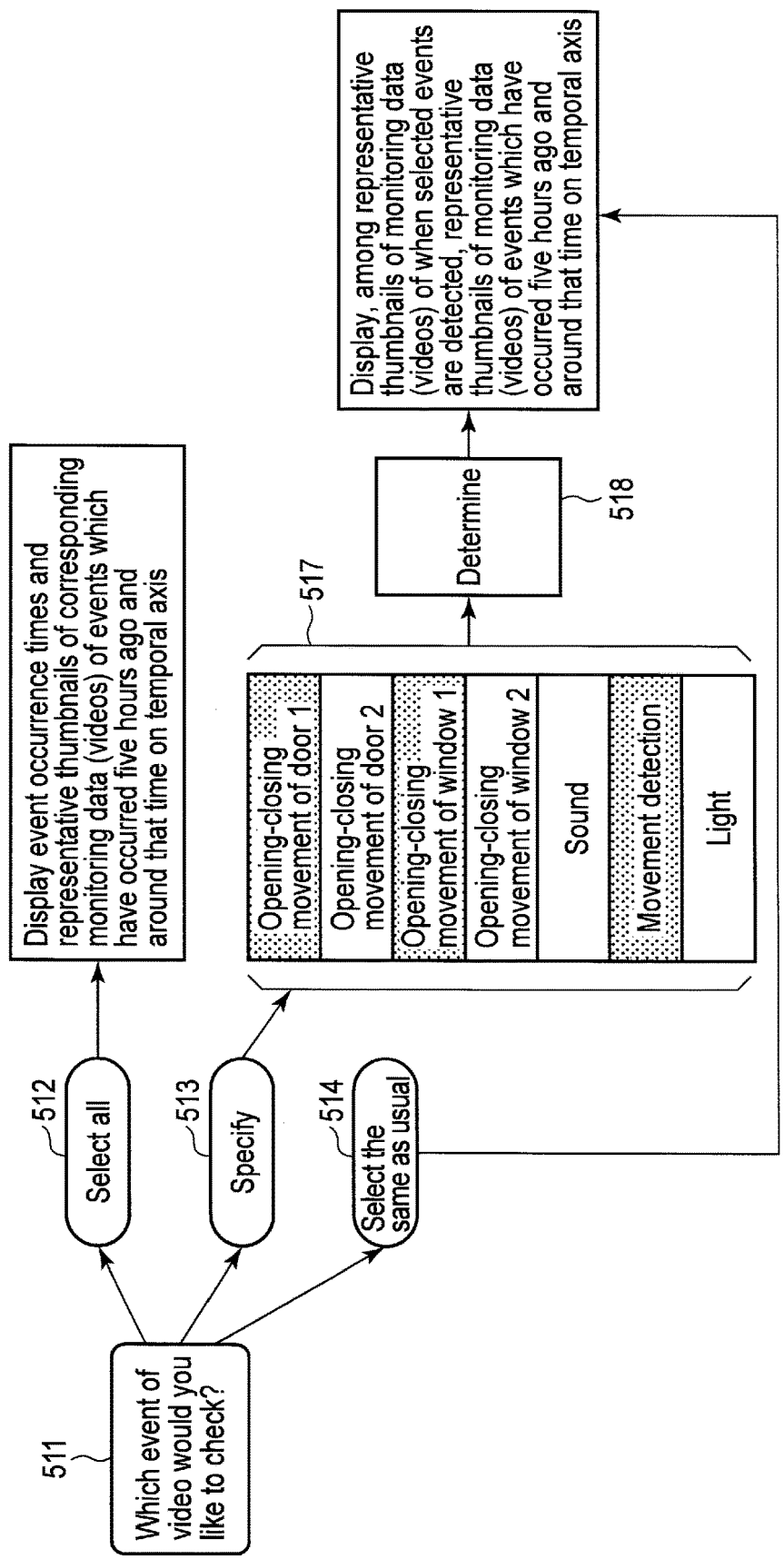
F I G. 5A

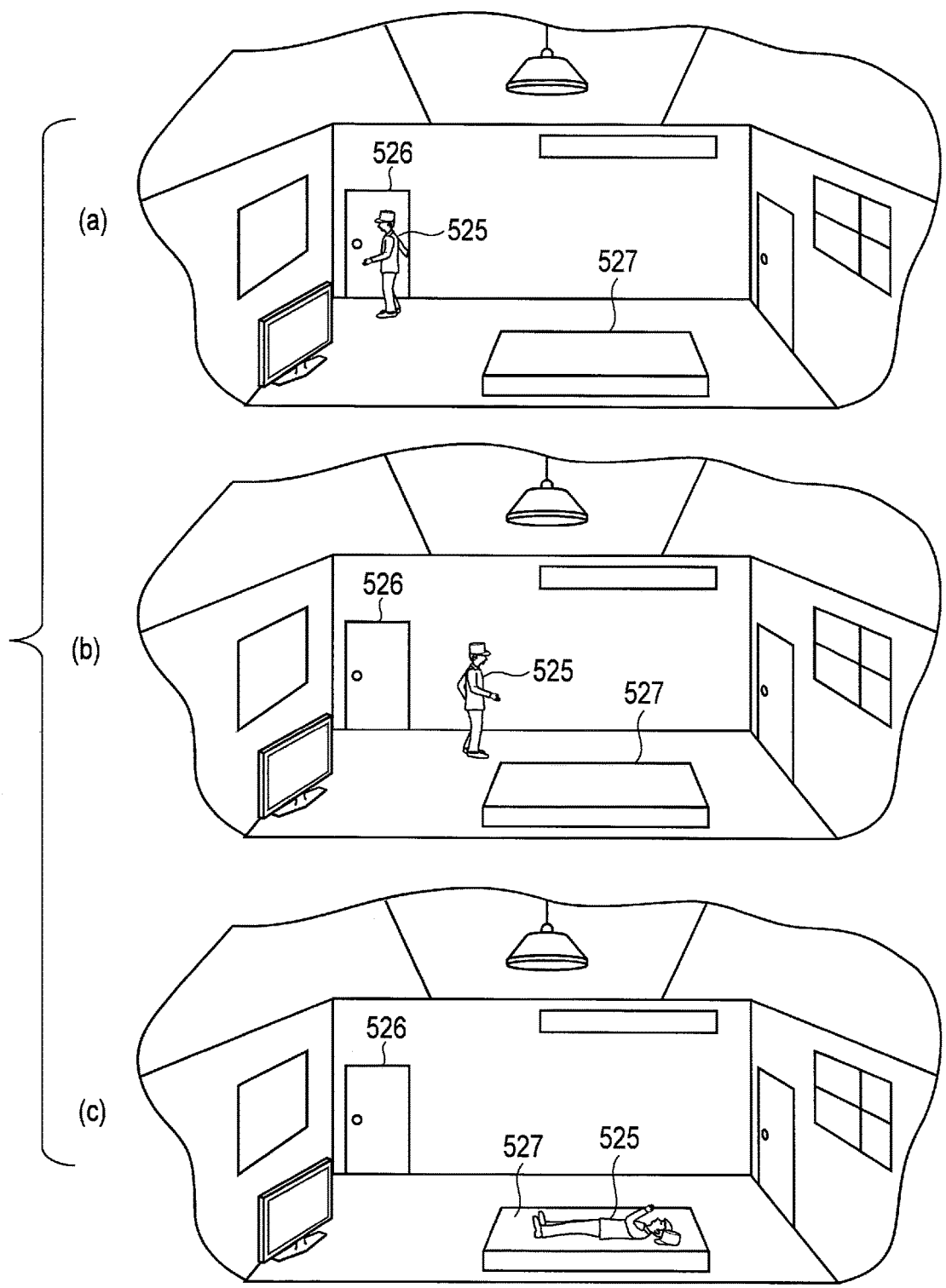
F I G. 7

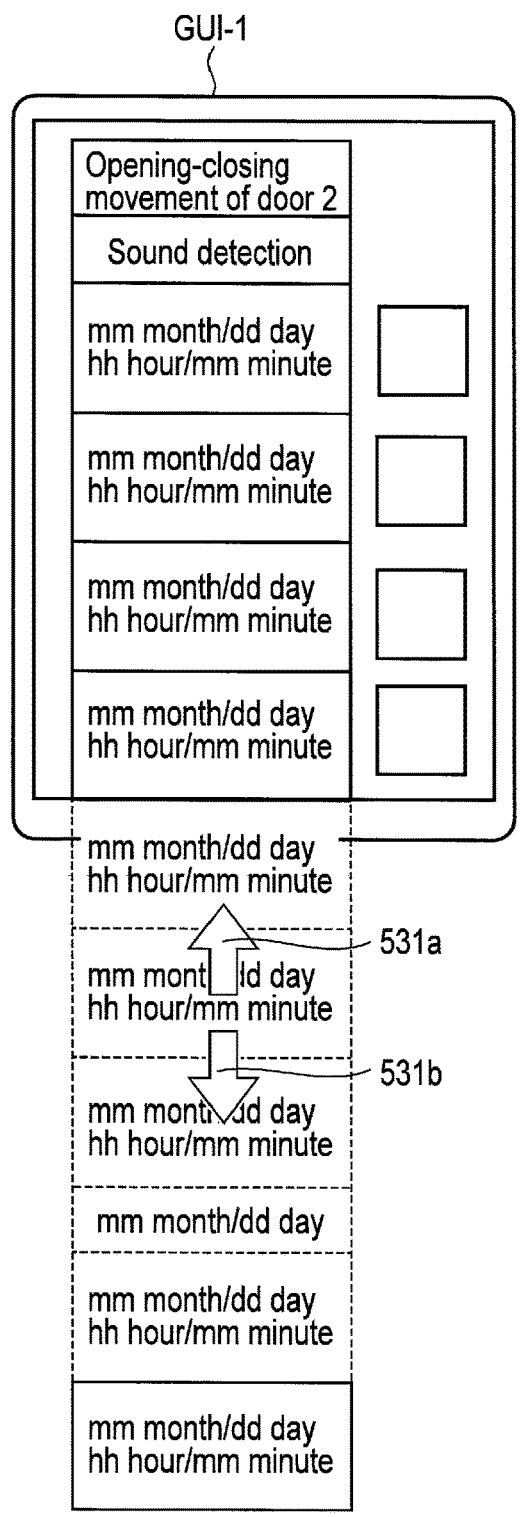
F I G. 8B

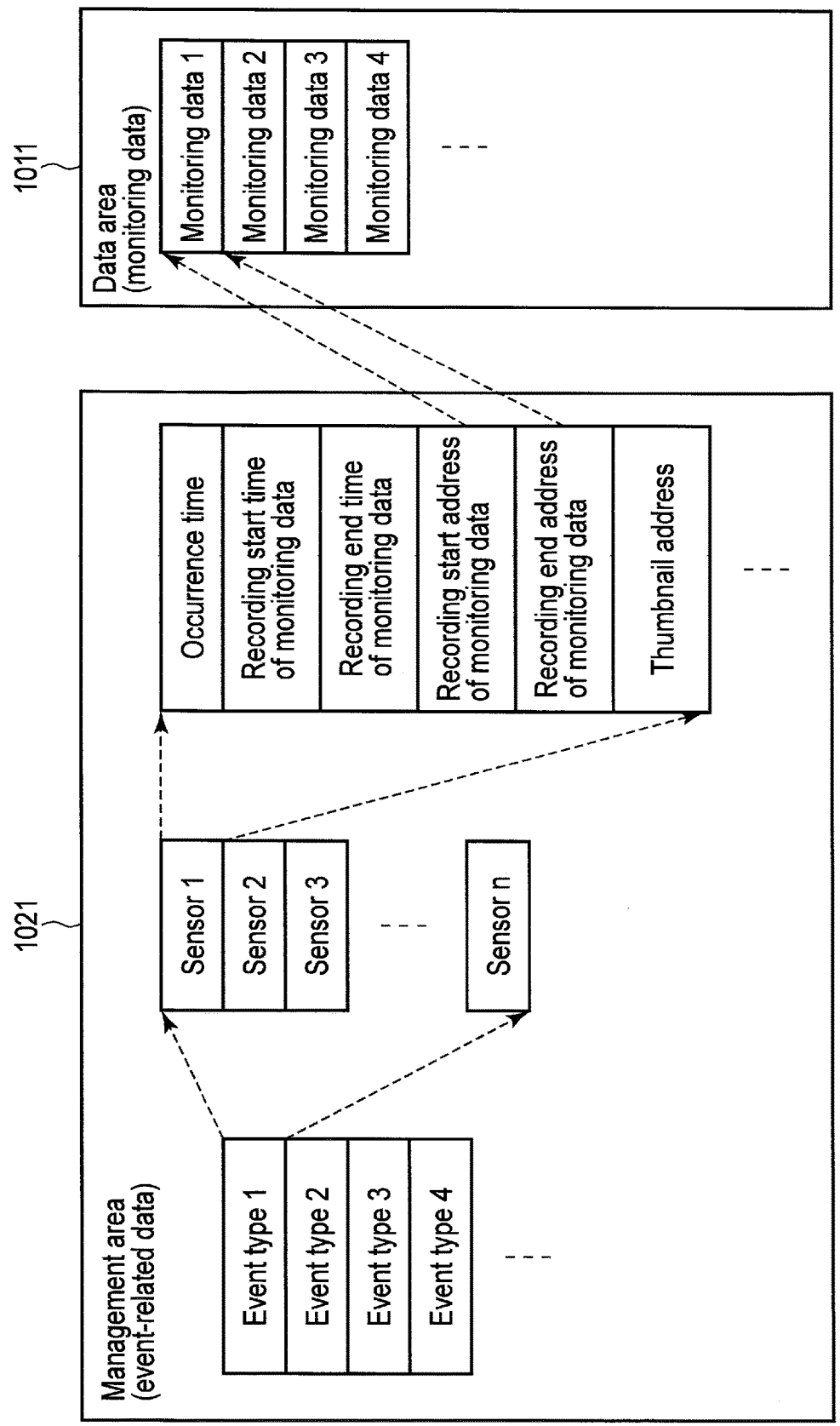
F I G. 10

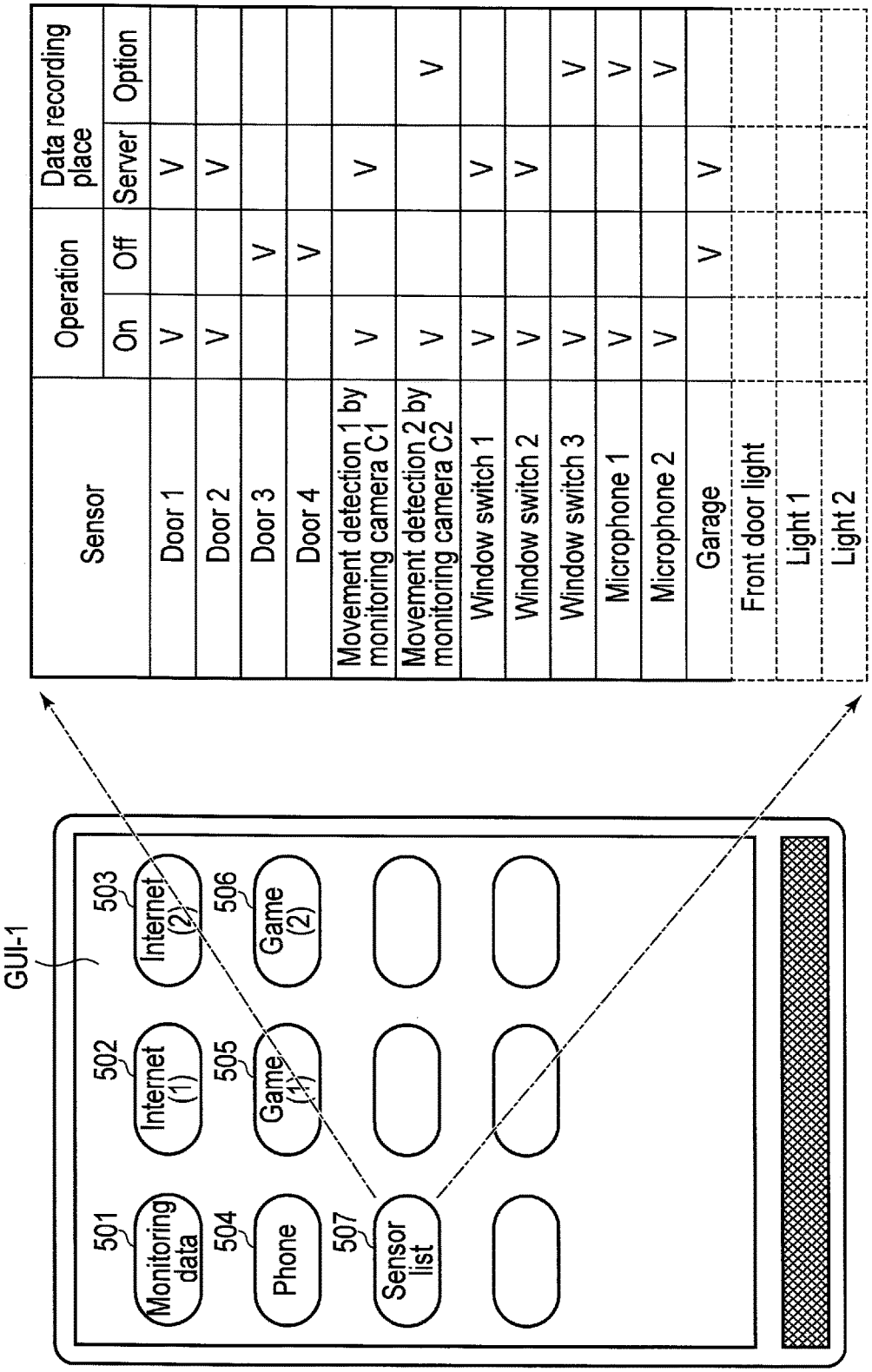
F I G. 12

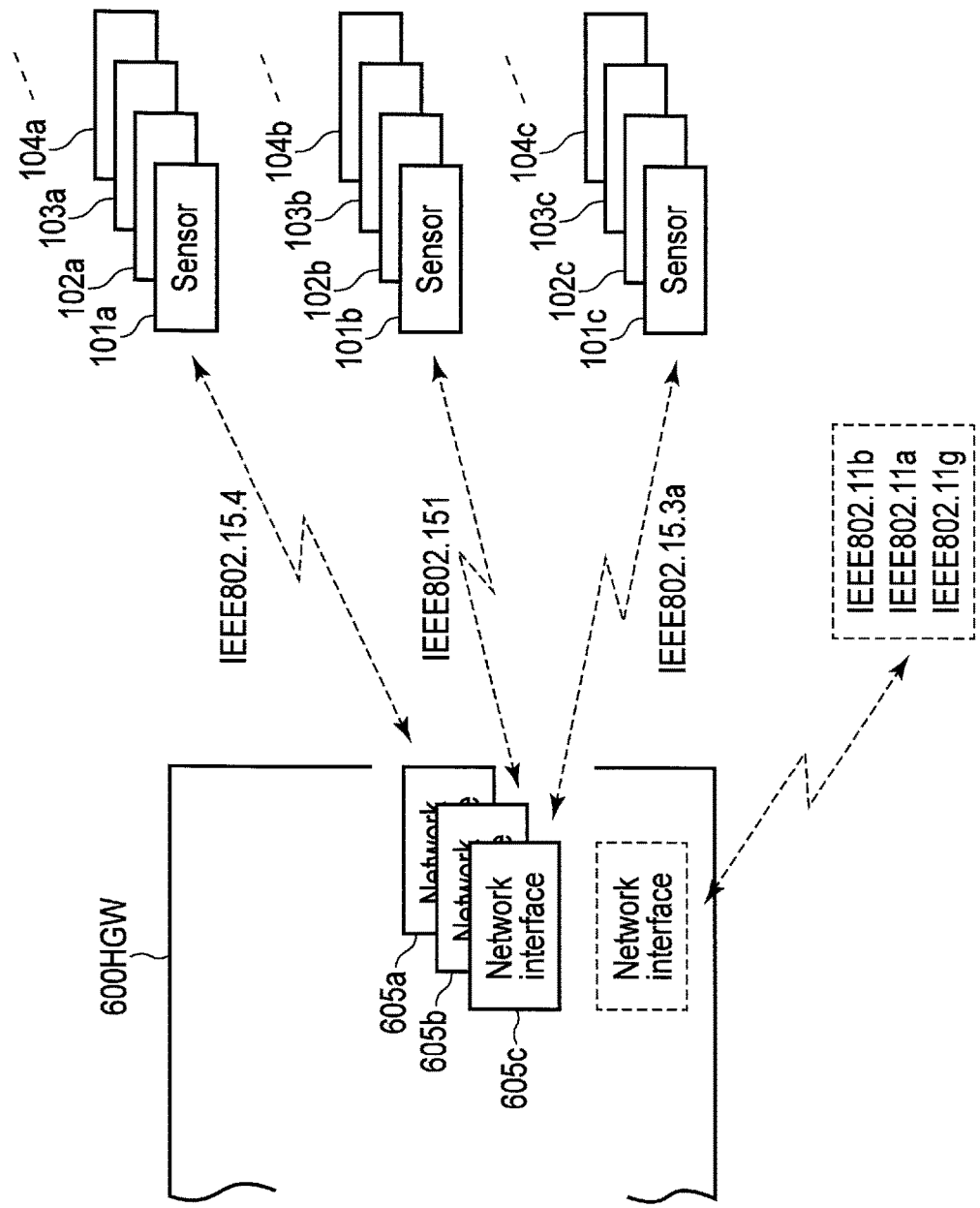
F I G. 13

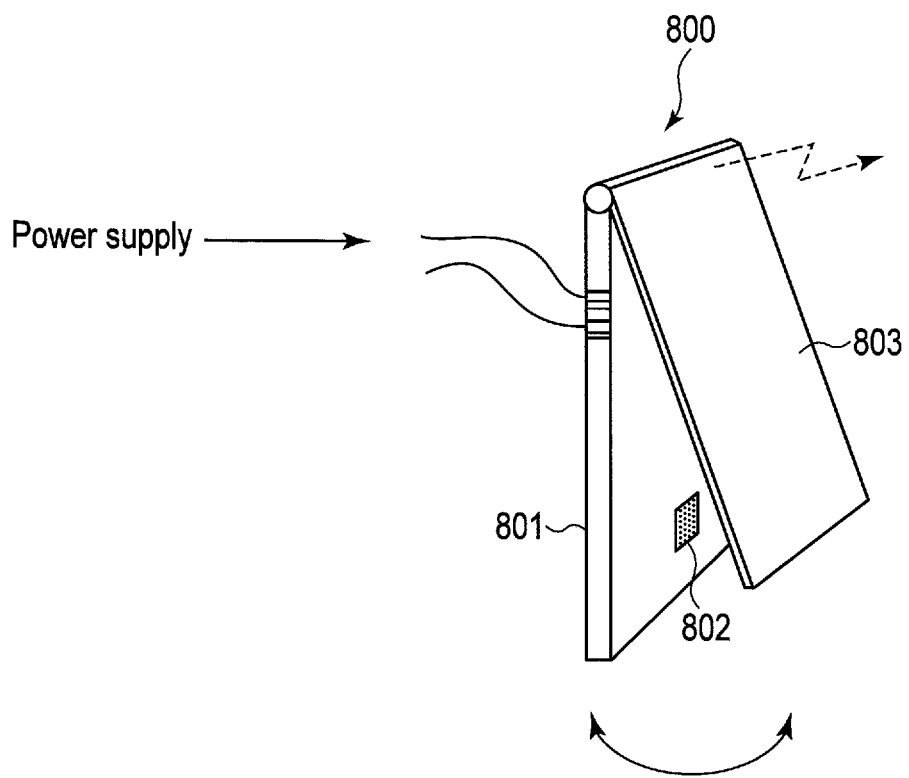
F I G. 15A
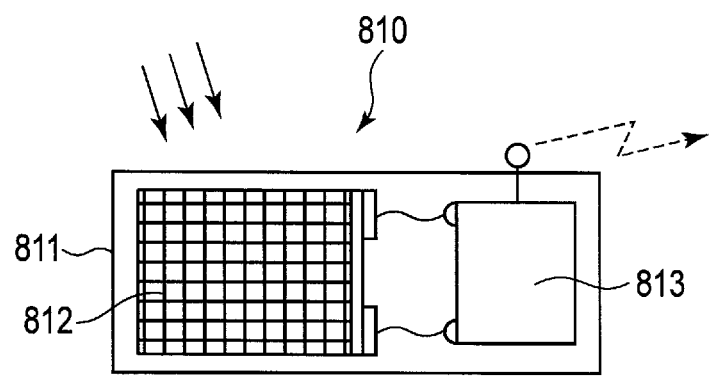
F I G. 15B

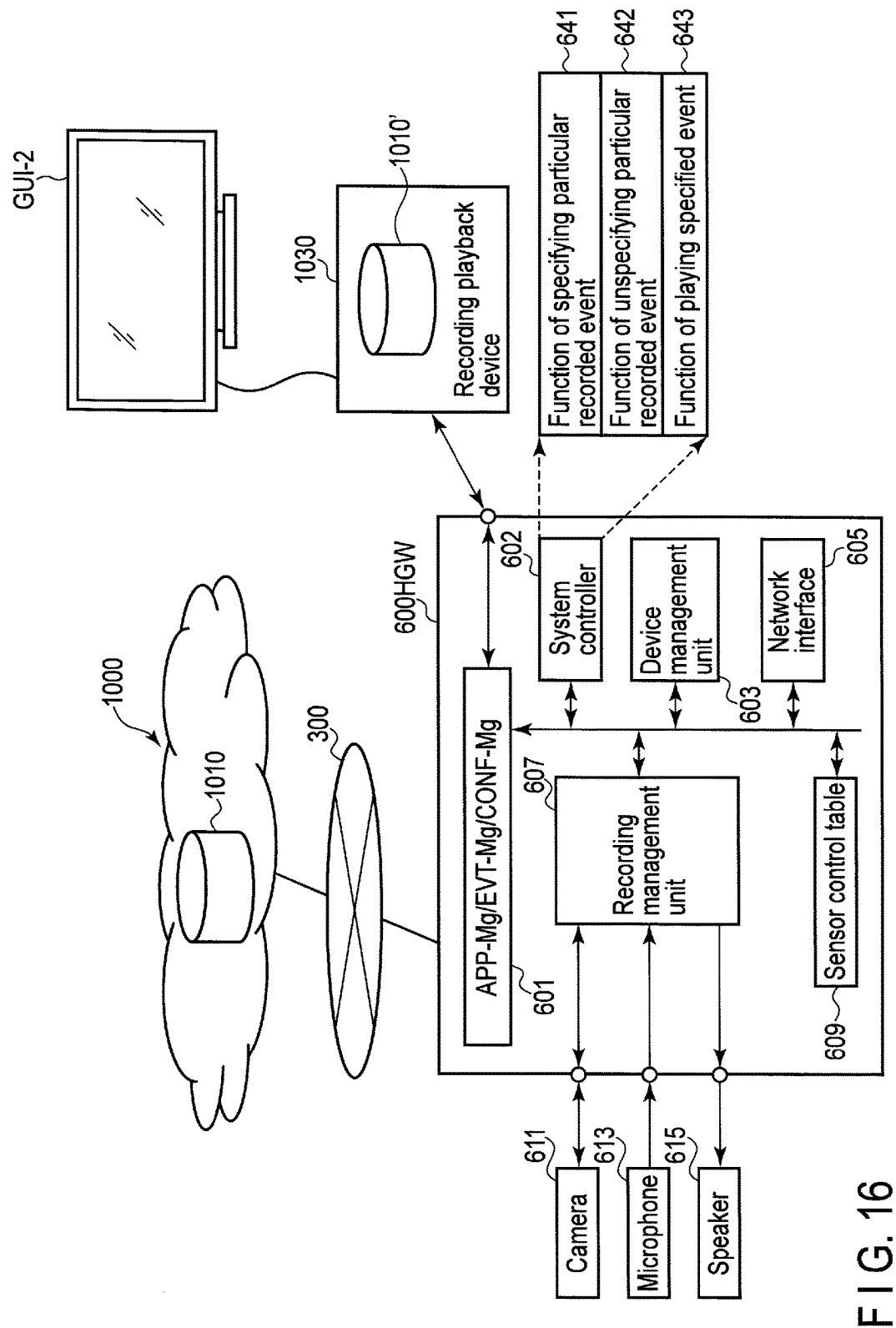
F I G. 16

DATA MONITORING AND MANAGEMENT DEVICE AND EVENT DATA MONITORING METHOD

CROSS-REFERENCE TO RELATED APPLICATIONS

This application is based upon and claims the benefit of priority from Japanese Patent Application No. 2016-200993, filed Oct. 12, 2016, the entire contents of which are incorporated herein by reference.

FIELD

Embodiments described herein relate generally to a data monitoring and management device and an event data monitoring method.

BACKGROUND

There are monitors which record video data and/or audio data in recorders. These monitors are used in houses, schools, hospitals, airports, shopping malls, and various other facilities. Further, the monitors are also used as voice recorders in airplanes, drive recorders in taxis, and the like. Still further, some monitors can transfer video data from monitoring cameras to portable devices.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a diagram showing an example of the overall structure of a network system which adopts a data monitoring and management device of an embodiment.

FIG. 4 is a diagram showing an example of a menu screen of a smartphone as a user interface which allows the user to access the event-related data and/or the monitoring data.

FIG. 5A is an explanatory diagram showing an example of the procedure for accessing the monitoring data from the smartphone.

FIG. 7 is a diagram showing an example of video to be played when monitoring data (video data) related to certain events is played.

FIG. 8B is an explanatory diagram showing another example of the relationship of the smartphone to the event-related data displayed on the screen of the smartphone and the operation method of the event-related data displayed on the screen of the smartphone.

FIG. 10 is a hierarchy chart showing an example of the recording position relationship between the event-related data and the monitoring data.

FIG. 12 is a diagram showing an example of the embodiment where a list of sensor operation modes is displayed.

FIG. 13 is a diagram showing an example of the embodiment where a gateway performs communication with a plurality of sensors using a plurality of wireless communication standards.

FIG. 15A is a diagram showing an example of a switch sensor.

FIG. 15B is a diagram showing an example of a light sensor.

FIG. 16 is a diagram showing the other embodiment.

DETAILED DESCRIPTION

Figure 2:
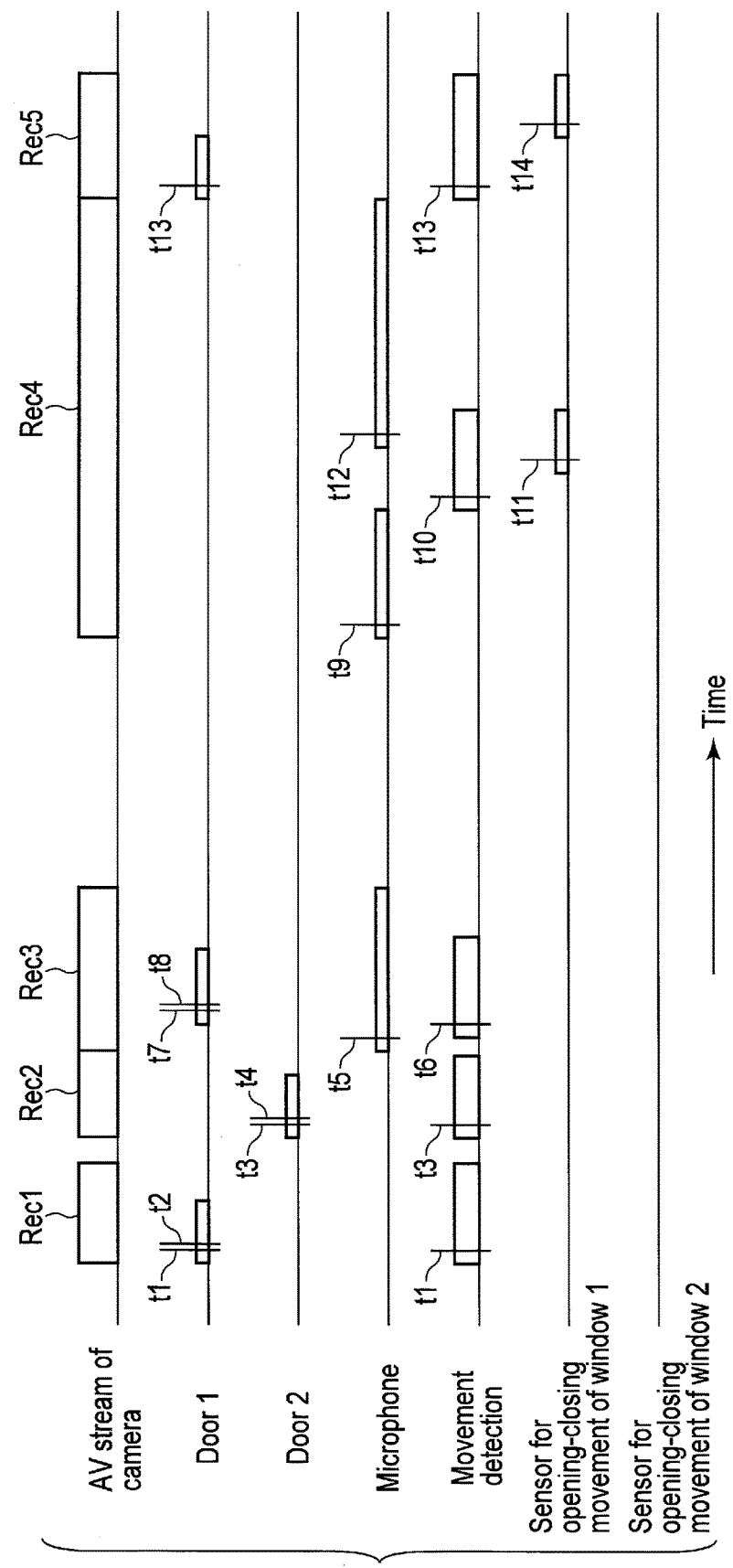
FIG. 2 is an explanatory diagram showing on a timeline, an example of a stream of event-related data and a stream of monitoring data recorded in the embodiment of FIG. 1.

Various embodiments will be described hereinafter with reference to the accompanying drawings.

It is preferable that monitors which record monitoring data such as video data and/or audio data should allow the users to effectively check the recorded data.

In general, according to one embodiment, there are provided a data monitoring and management device which records, based on detection of at least one event by a sensor, monitoring data and event-related data which is related to the event, uses the event-related data effectively, and allows the user to check the recorded monitoring data further effectively.

According to one embodiment, a data monitoring and management device comprises an instruction unit (621) which records event-related data of when an event is detected and monitoring data of when the event occurs in a recording medium; and a display data output unit (627) which outputs the event-related data from the recording medium and plays the event-related data as display data, wherein the display data output unit outputs, when receiving a specification input to the displayed event-related data, monitoring data which corresponds to the event-related data.

An embodiment will further be described with reference to the drawings.

In FIG. 1, a server 1000 is connectable to a home gateway (hereinafter referred to as an HGW) 600 via the Internet 300. The HGW 600 comprises a control data management unit 601, a system controller 602, a device management unit 603, a network interface (hereinafter referred to as a network I/F) 605, a recording management unit 607, a camera 611, a microphone 613, a speaker 615, and the like. Further, the HGW 600 includes a sensor control table 906.

The control data manager 601 includes an application management unit (hereinafter referred to as an APP-Mg), an event management unit (hereinafter referred to as an EVT-Mg), and a configuration management unit (hereinafter referred to as a CONFIG-Mg). The APP-Mg manages a plurality of applications which control various operations of the HGW 600. The EVT-Mg manages an event application which controls various operations resulting from occurrence of various events which will be described later. Further, the CONF-Mg recognizes functions provided within the HGW 600 and various other functions related to the HGW 600 and manages a configuration application which controls an operation order, imposes an operation restriction, and the like, for example.

The system controller 602 can perform sequence control by controlling all the function blocks of the HGW 600.

The EVT-Mg can control the camera 611, the microphone 613, the speaker 615, the recording management unit 607, and the like. Further, the EVT-Mg can determine data which is detected from an external sensor and is input from the network I/F 605 and/or data which is obtained from the camera 611, the microphone 613, and the speaker 615, and can control the next actions or operations. The CONFG-Mg can make an initial setting of each function block of the HGW 600, and various other settings such as a function restriction setting, a function expansion setting, a priority order setting, and an operation time setting.

The device management unit 603 can approve other devices which operate in association with the HGW 600 and can register these devices in a memory. Therefore, the device management unit 603 can manage other sensors 101, 102, 103, . . . which are in connection via the network I/F 605. Further, the device management unit 603 also registers identification data of the server 1000 which is connected via the Internet 300, and thus the device management unit 603 can recognize the server 1000. Still further, the device management unit 603 also registers identification data of a smartphone GUI-1 which is connected via the Internet 300 and the like, and thus the device management unit 603 can recognize the smartphone GUI-1 and the like.

Still further, the sensor control table 609 stores the name, the position information, and the control data of each of the sensors 101, 102, 103 and 104 which will be described later. Still further, the name and the position information of each sensor can be displayed on the screen of the smartphone GUI-1, and thus the user can check the types of sensor or the installation positions of the sensors.

The network I/F 605 is connected to the other sensors 101, 102, 103, . . . , for example, within a house via Near Field Communication. In the drawing, the structure of the sensor 101 is representatively shown. The sensor 101 includes a control data management unit 112 and a network I/F 115. Further, the sensor 101 has functions 116 and 117 as sensing elements. Note that the sensor is not necessarily limited to this type but may be various other types.

The control data management unit 112 includes an application management unit (APP-Mg), an event management unit (EVT-Mg), and a configuration management unit (CONFIG-Mg). The CONFIG-Mg manages various applications which control the operation of the whole sensor system. The EVT-Mg manages an event application which performs the next operation of the sensor 101 based on the detected data from the functions 116 and 117. The functions 116 and 117 include structural elements serving their sensing purposes, respectively. For example, there is a case where a camera and a microphone are provided as the structural elements as in the HGW 600. Further, the structural elements also include a thermal sensor, a temperature sensor, a humidity sensor, a light sensor, a pressure sensor, a switch, and the like. According to the operation purpose, the sensor 101 may comprise one sensing element or a plurality of sensing elements.

The above-described sensors 101, 102, 103, . . . are installed in various positions, for example, in the house as a sensor which detects an opening-closing movement of a door, a sensor which detects a movement of a person, a sensor which detects an opening-closing movement of a window, a sensor which shoots a video, or the like.

In the above-described system, when one or more detection signals are output from one or more of the sensor (camera) 611, the sensor (microphone) 613, and the other sensors 101, 102, . . . , the control data management unit 601 recognizes event occurrence. Then, the control data management unit 601 controls the camera 611 via the recording management unit 607. In this way, the camera 611 transmits monitoring data which has been cached since before (for example, since ten minutes before) the event occurrence time to a recording medium via the recording management unit 607 and the control data management unit 601, and continuously transmits the recorded monitoring data (video data) for a certain period of time (for example, for three, five, ten, twenty, or thirty minutes). In the present system, along with monitoring data, event-related data (referred to also as event attribute data) of when the event is detected is also transmitted to a recording medium 1010.

The event-related data can include, for example, one or more of the event occurrence time, the sensor which has detected the event, the position data of the sensor, the recording start time, the recording end time, and the like.

Note that, although the recording medium 1010 is assumed to be, for example, a memory in the sever 1000 in FIG. 1, the recording medium 1010 is not necessarily a recording medium provided in the sever. Further, the monitoring data may be recorded in a recording medium in the HGW 600 or may be recorded in a recording medium which is connected via the network I/F 605. The recording medium 1010 comprises a data area 1011 and a management area 1021. Further, monitoring data 1012 is recorded in the data area 1011, and event-related data 1022 is recorded in the management area 1021.

There is a case where the monitoring data 1012 includes video data as well as measurement data from a sensor. For example, the measurement data includes a change in temperature, a change in humidity, a change in pressure, and the like in a particular position. In the management area 1021, management data used for playing the monitoring data is recorded. The previously-mentioned event-related data is included in the management data. The management data includes event-related data and the recording address of monitoring data corresponding to the event-related data. In response to a plurality of events, a plurality of items of event-related data and a plurality of items of monitoring data corresponding to the plurality of items of event-related data are recorded, accordingly.

The event-related data includes the type of event (referred to also as the type of sensor). Further, in response to an event, monitoring data (for example, monitoring video) is recorded, and event-related data includes the recording start time, the recording end time, and the like of the monitoring data.

FIG. 2 shows the progress of monitor data recording processes in the recording medium with time in response to events. The following description is based on the assumption that various sensors are installed in the living room of the house. As the sensors, a sensor which detects an opening-closing movement of a door 1, a sensor which detects an opening-closing movement of a door 2, a sensor which detects an opening-closing movement of a window 1, a sensor which detects an opening-closing movement of a window 2, a microphone, a movement detection sensor (such as a video sensor or an infrared sensor) are installed. Further, the HGW 600 is installed in the corner of the ceiling of the living room, and the camera can shoot a video of the living room.

Now, a child 1 enters the living room from the door 1, and the door 1 is opened at a time t1 and is closed at a time t2. At the time t1, movements are detected by the camera. When a door is opened or closed, a video is continuously recorded for about three minutes, for example. In this detection period, movements are continuously detected, and a video is continuously recorded. While the video is recorded, sounds are picked by the microphone 613. Consequently, the monitoring data resulting from the first event (note that, in this case, two events have occurred) is recorded as recording data Rec1, for example, in the recording medium 1010 (or may be a recording medium in the HGW 600 or a recording medium which is directly connected to the HGW 600, if any). Further, as the event-related data, the sensor ID of the sensor which is attached to the door 1, the camera ID of the camera 611, and the recording start time and the recording end time of the recording data Rec1. Still further, the management data (event-related data) also includes an address in the recording medium 1010 at which the recording data Rec1 is recorded.

A short time later, a child 2 enters the living room from the door 2, and the door 2 is opened at a time t3 and is closed at a time t4. At the time t3, movements are detected by the camera. The monitoring data resulting from the second event (note that, in this case, two events have occurred) is recorded as recording data Rec2 in the recording medium 1010.

Next, big sounds are picked by the microphone 613 at a time t5, movements are detected at a time t6, and opening-closing movements of the door 1 are detected at times t7 and t8, respectively. For example, the child 2 sings aloud, the movements of the child 2 are detected, and the child 1 leaves the living room from the door 1. In response, the monitoring data resulting from the third event (note that, in this case, three events have occurred) is recorded as recording data Rec3 in the recording medium 1010.

After a while, big sounds are picked by the microphone 613 at a time t9, movements are detected by the camera 611 at a time t10, the window 1 is opened at a time t11, and big sounds are picked by the microphone 613 again at a time t12. For example, the child 2 sings aloud, and then the child 2 moves to the window 1, opens the window 1, and sings aloud again. In response, the monitoring data resulting from the fourth event (note that, in this case, four events have occurred) is recorded as recording data Rec4 in the recording medium 1010.

Next, the child 1 enters the living room from the door 1 at a time t13, and the window 1 is closed at a time t14. In response, the monitoring data resulting from the fifth event (note that, in this case, three events have occurred) is recorded as recording data Rec5 in the recording medium 1010.

As described above, when the event-related data and the monitoring data are recorded in the recording medium 1010, if the user wishes to check the monitoring data, the HGW 600 can present the monitoring data to the smartphone GUI-1 in various forms.

Figure 3:
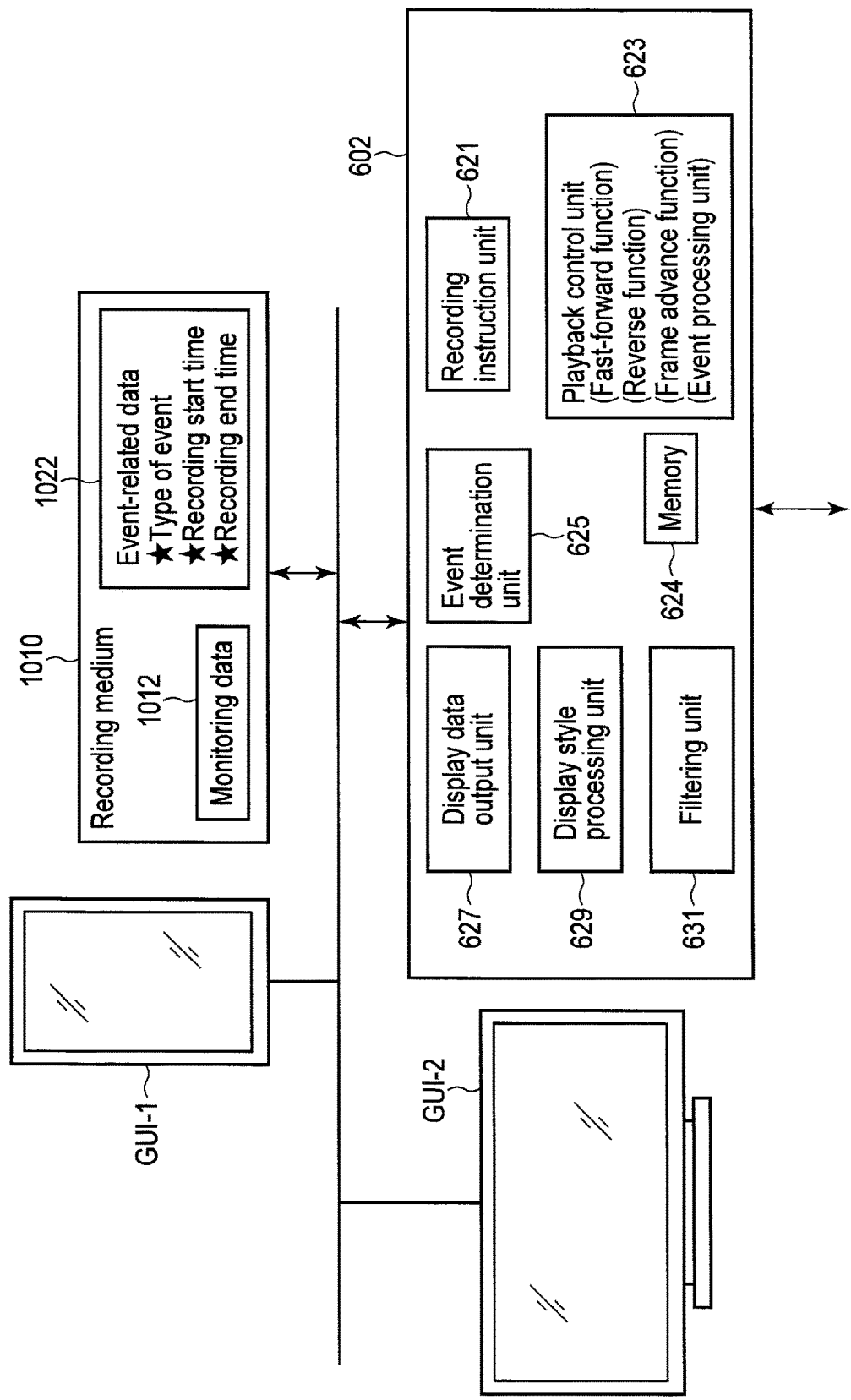
FIG. 3 is a block diagram showing main structural elements of the embodiment.

FIG. 3 shows an example of the internal structure of the system controller 602 shown in FIG. 1. An event determination unit 625 determines the detection signals from the respective sensors which have been described above with reference to FIG. 2. If an event is detected, a recording instruction unit 621 transmits the monitoring data 1012 to the recording medium 1010 and instructs the recording medium 1010 to record the monitoring data 1012. At the same time, the event-related data is transmitted to and recorded in the recording medium 1010.

If the event determination unit 625 receives a specific instruction signal from the smartphone GUI-1, the event determination unit 625 also determines it as an event. For example, when the first user who has the smartphone GUI-1 is talking on the phone with the second user who stays at home, the first user can transmit an event initiation signal to the HGW 600 by operating a specific key of the smartphone GUI-1. Further, even when the first user is not talking on the phone, the first user can transmit an event initiation signal to the HGW 600 by operating a specific key of the smartphone GUI-1. Still further, the second user who stays at home can transmit an event initiation signal to the HGW 600 by intentionally operating a sensor. For example, to perform maintenance, the second user can transmit an event initiation signal to the HGW 600 by intentionally operating a sensor which senses on-off operations of a light (for example, by covering and uncovering a light receiving unit of the sensor).

If the user wishes to check monitoring data, the user can request the HGW 600 (system controller 602) to play monitoring data related to a desired event via the smartphone GUI-1 or a television receiver GUI-2 which is connected to the Internet.

Therefore, the system controller 602 comprises a playback control unit 623 which arbitrarily outputs event-related data and monitoring data from the recording medium 1010. The playback control unit 623 includes an event processing unit which performs a fast-forward function, a reverse function, a frame advance function, and also performs event integration processing. Further, since a large volume of event-related data and monitoring data is recorded in the recording medium 1010, the system controller 602 allows the user to effectively check the desired monitoring data.

Therefore, the system controller 602 comprises a filtering unit 631 which can classify or select various events and a display style processing unit 629 which can produce a display list or a display array. The produced display array or the output monitoring data are transmitted to a monitor such as the smartphone GUI-1 or the television receiver GUI-2 via a display data output unit 627. Further, the system controller 602 includes a memory 624 which temporarily stores the data or the list.

The system controller 602 communicates with the smartphone GUI-1 or the television receiver GUI-2 and transmits the produced display array or the output monitoring data to the monitor. Further, according to an instruction from the smartphone GUI-1 or the television receiver GUI-2, the playback control unit 623 can execute the fast-forward function, the reverse function, or the frame advance function on a video which records an event. Still further, the playback control unit 623 includes an event processing unit for event-related data processing and performs event arrangement order control processing, event selection processing, and the like.

FIG. 4 shows a state where a menu is displayed on the screen of the smartphone GUI-1, for example. In the menu, for example, there are selection buttons such as a monitoring data request button 501, an Internet (1) connection button 502, an Internet (2) connection button 503, a phone activation button 504, a game (1) start button 505, and a game (2) start button 506. Further, there is also a sensor list button 507, and when the user operates this button 507, the user can display a list of event detection sensors.

Figure 5B:
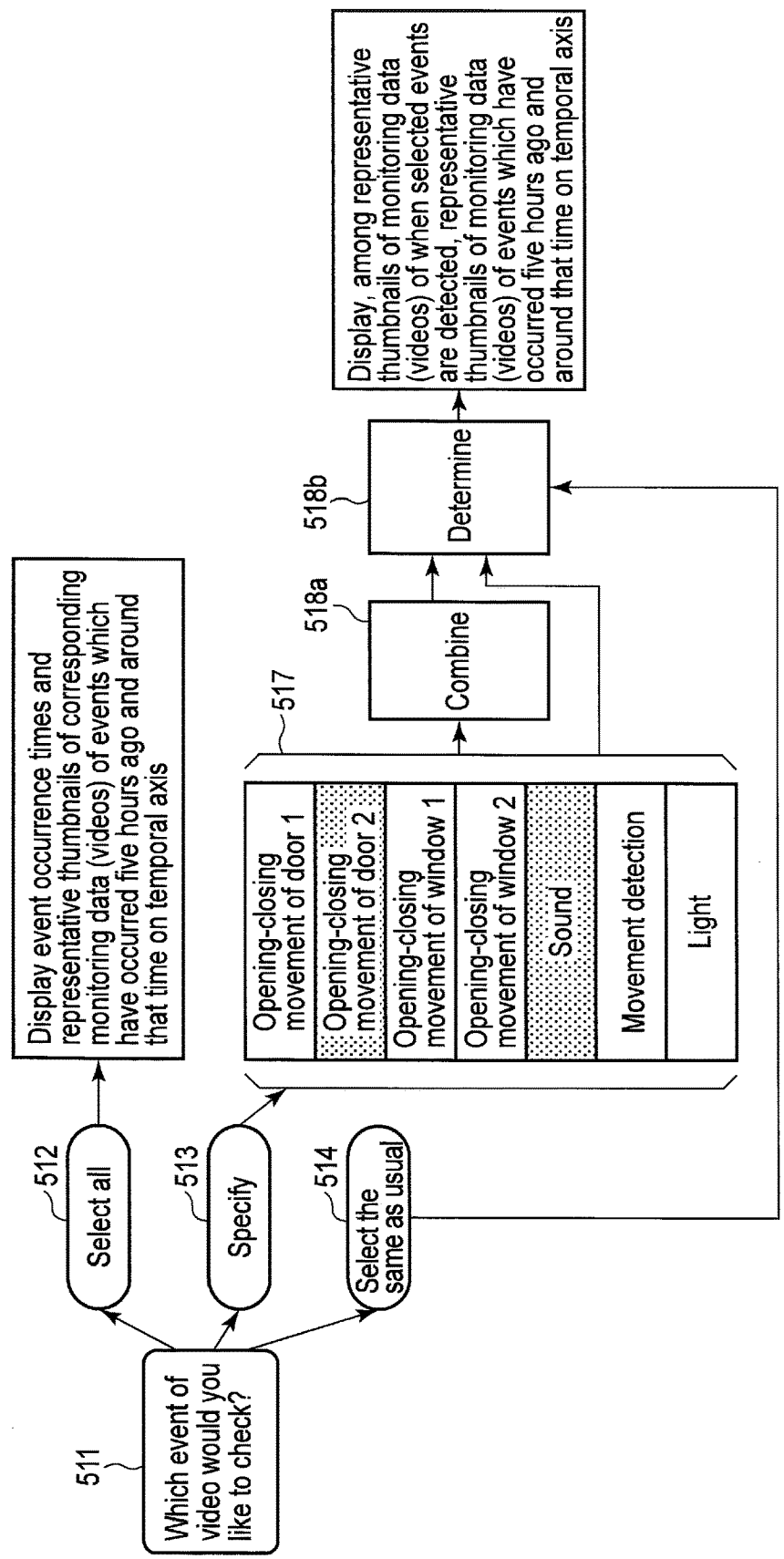
FIG. 5B is an explanatory diagram showing another example of the procedure for accessing the monitoring data from the smartphone.

Here, it is assumed that the user operates the monitoring data request button 501. Then, for example, as shown in FIG. 5A or 5B, the following message: "Which event of video would you like to check?" and buttons 512, 513 and 514 such as the following buttons: "Select all", "Specify" and "Select the same as usual" are displayed on the screen of the smartphone GUI-1.

When the user perform a touch operation and selects the button 512: "Select all", under the control of the control data management unit 601, event occurrence time data (of all events regardless of sensors), and a part (thumbnails) of monitoring data (video data recorded by the camera) of when the respective events have occurred are transmitted to the smartphone GUI-1. Since a large volume of event-related data and monitoring data is recorded in the recording medium 1010, the event-related data and the representative thumbnails of the corresponding monitoring data of an event which has occurred, for example, five hours ago and of a plurality of (three to five) events which have occurred around that time are selected and displayed as the display data corresponding to the display start time. The representative thumbnail is the monitoring data (video data) corresponding to the event occurrence time, for example.

When the message: "Which event of video would you like to check?" is displayed on the screen of the smartphone GUI-1, the user can select a desired event by performing a touch operation on the button 513: "Specify". In this case, for example, a list 517 of the reference names of the active sensors in the house (opening-closing movement of door 1, opening-closing movement of door 2, opening-closing movement of window 1, opening-closing movement of window 2, . . . , and the like) is displayed. The user can touch and select one or more of events whose videos the user wishes to check. In the case shown in FIG. 5A, the items: "opening-closing movement of door 1"; "opening-closing movement of window 1"; and "movement detection" are selected and determined. Note that, although only a few simple events are shown in this case, more events and more titles of events will be set in reality.

When the user selects events whose videos the user wishes to check and performs a determination operation 518, as will be described later, the representative thumbnails of the monitoring data of when the selected events have occurred and the corresponding event-related data are displayed. In this case also, since a large volume of event-related data and monitoring data is recorded in the recording medium 1010, the event-related data and the representative thumbnails of the corresponding monitoring data of an event which has occurred, for example, five hours ago and of a plurality of (three to five) events which have occurred that time are selected and displayed as the display data corresponding to the display start time.

When the message: "Which event of video would you like to check?" is displayed on the screen of the smartphone GUI-1, the user can select the same events of videos as usual by performing a touch operation on the button 514: "Select the same as usual". Note that the button 514 will be active on the condition that the button 513: "Specify" has been operated before and then the determination operation 518 has been performed. In this case, based on an event which has already been specified, the event-related data and the representative thumbnails of the corresponding monitoring data of an event which has occurred, for example, five hours ago and of a plurality of (three to five) events which have occurred around that time are selected and displayed.

Figure 8A:
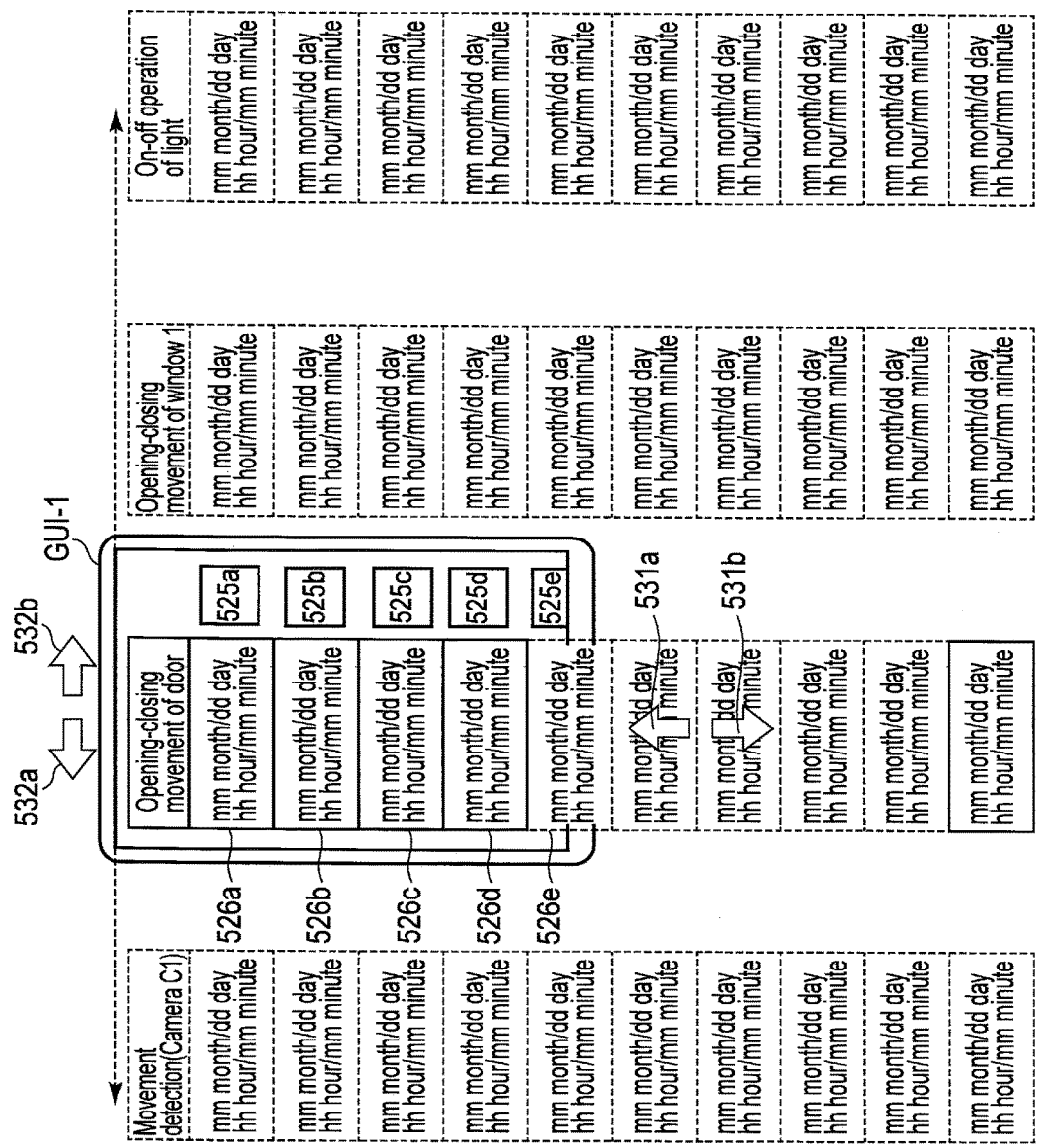
FIG. 8A is an explanatory diagram showing an example of the relationship of the smartphone to the event-related data displayed on the screen of the smartphone and the operation method of the event-related data displayed on the screen of the smartphone.

In FIG. 5A, the monitoring data is separately managed from one selected event to another, and the event-related data of each selected event is chronologically arranged. An example of the display corresponding to the arrangement on the screen of the smartphone will be described later with reference to FIG. 8A. However, the display of the event-related data is not limited to this example. It is possible, by making a setting shown in FIG. 5B, to display the event-related data of various events in combination (FIG. 8B).

That is, as shown in FIG. 5B, before the determination button 518*b*, a combination button 518*b* may be displayed. If the combination button 518*a* is operated, it is possible to chronologically display the event-related data of the selected items in the event list (in this case, two items: opening-closing movement of door 2; and audio detection) in combination. That is, when the combination button 518*a* and the determination button 518*b* are operated in succession, for example, such an array of event-related data as that shown in FIG. 8B, which will be described later, will be displayed.

As described above, before the user requests the control data management unit 601 to play the monitoring data related to the desired events, the user can notify the control data management unit 601 of the events whose videos the user wishes to play.

Figure 6A:
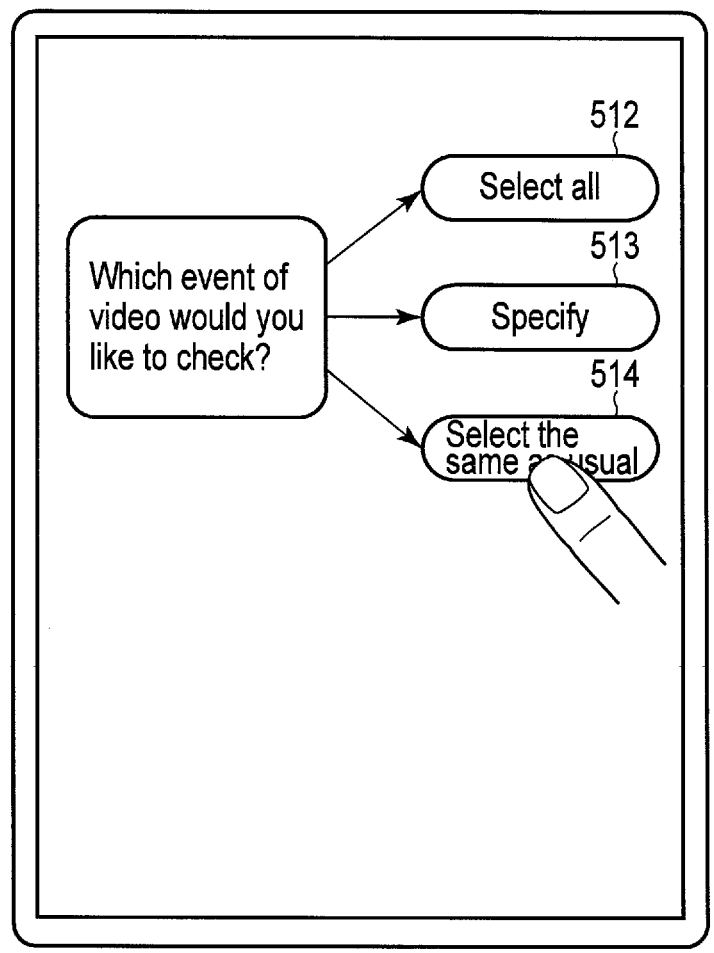
FIG. 6A is a diagram showing an example of the operation screen of the smartphone.
Figure 6B:
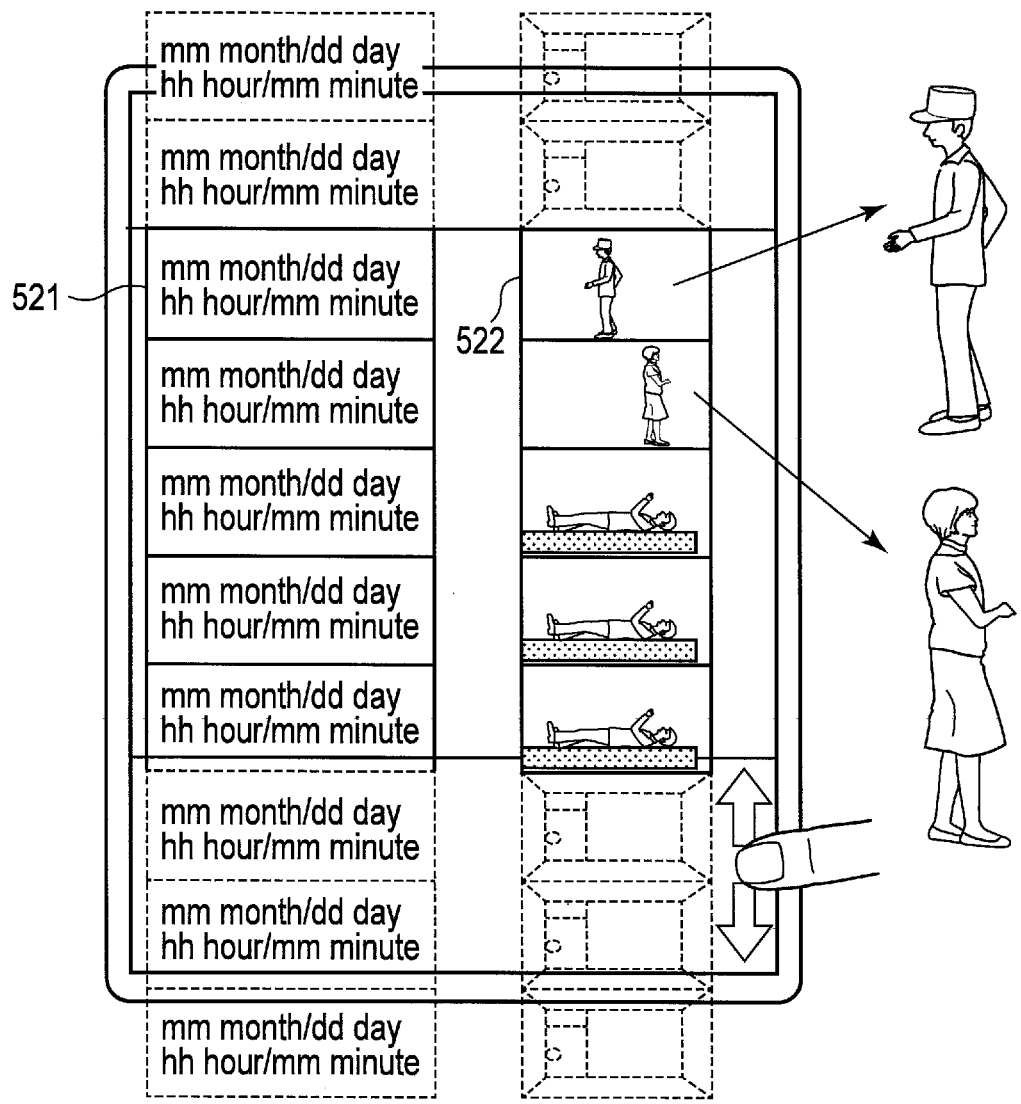
FIG. 6B is a diagram showing another example of the operation screen of the smartphone.

FIG. 6A shows an operation screen which is to be displayed after the monitoring data request button 501 is operated in the menu of the smartphone GUI-1 shown in FIG. 4. Here, as previously described, the message: "which event of video would you like to check?" and the buttons such as the buttons 512, 513 and 514: "Select all", "Specify" and "Select the same as usual" are displayed to the user. It is assumed that, for example, the user selects the button 514: "Select the same as usual". Then, for example, an event list such as that shown in FIG. 6B is displayed. As described with reference to FIG. 3, the playback control unit 623 reads event-related data and monitoring data from the recording medium 1010, the filtering unit 613 performs the filtering processing, and then the display style processing unit 629 produces the event list. Note that, in the filtering processing, it is also possible to read the event-related data from the recoding medium 1010 by the playback control unit 623, apply the filtering processing to the event-related data, and then output the monitoring data corresponding to the extracted event-related data from the recording medium 1010 in this order.

In the above example, a case where an event list is displayed in response to a request from the smartphone GUI-1 has been described, but the same also applies to a case where an event list is displayed in response to a request from the television receiver GUI-2. Note that, in the case of the television receiver GUI-2, it is possible to perform an operation by operating a cursor on the screen using a remote controller.

Further, although thumbnails of the monitoring data are simplified in FIG. 6B, images captured at the respective viewing angles of the camera 611 will be displayed in an actual list.

Now, a thumbnail 522 of an event 521 is selected from the list of FIG. 6B by a touch operation. Then, the playback control unit 623 (shown in FIG. 3) starts continuous playback of monitoring data of, for example, about ten minutes long since five minutes before the event 521 had occurred, and the monitoring data is transmitted to the monitor. The video to be displayed in this example is shown in FIG. 7.

In the video shown in FIG. 7, a person 525 opens a door 526 and enters a room, walks to a bed 527, and lies on the bad 527. When a list of a plurality of items of monitoring data corresponding to a plurality of items of event-related data is displayed according to an instruction from the smartphone GUI-1 or the television receiver GUI-2, and if a desired item of monitoring data is selected from the displayed list of the plurality of items of the monitoring data, the playback control unit 623 continuously plays the specified monitoring data for the corresponding recording time.

Further, according to an instruction from the smartphone GUI-1 or the television receiver GUI-2, as will be described below, the playback control unit 623 (shown in FIG. 3) can perform the fast-forward function, the reverse function, and the frame advance function on the video which records the event.

Still further, since the playback control unit 623 can refer to event-related data, the playback control unit 623 can continuously play a plurality of items of monitoring data related to a plurality of events in the fast-forward mode or in the ordinary mode.

Still further, the playback control unit 623 can play a plurality of items of monitoring data related to a specified event in the fast-forward mode or in the ordinary mode.

Still further, the display control unit shown in FIG. 3 comprises an event processing unit which processes a plurality of items of event-related data, and the event processing unit can integrate and process a plurality of items of event-related data corresponding to a specific event. For example, there is a case where a sporadic event occurs. For example, a big sound or a movement (such as a swing of a blind) is sporadically detected. In such a case, a detection time of a sporadic event should be integrated into a sequence of detection times, and monitoring data should be presented to the user based on integrated event-related data.

In the above-described embodiment, video data which is recorded by the camera 611 for a certain time (five, ten, fifteen or twenty minutes long) in response to event detection is recorded as monitoring data. Here, the recording time of monitoring data of each event may be appropriately changed. Further, the recording time of one event may be different from the recording time of another event. Still further, the recording time of monitoring data may vary depending on the time of day in which an event occurs.

As the event arrangement method (method of arranging thumbnails corresponding to event-related data), any arrangement method can be applied by an arrangement application, and thumbnails corresponding to event-related data will be displayed according to the arrangement method.

FIG. 8A shows a display example where event-related data and thumbnails of monitoring data related to the event-related data are classified by event category. In the example, an event issued in response to movement detection, an event issued in response to an opening-closing movement of door 1, and an event issued in response to an on-off operation of light 1 are shown as event categories.

Now, the smartphone GUI-1 displays thumbnails 525a to 525d corresponding to event-related data 526a to 526d related to events issued in response to opening-closing movements of the door 1. The event-related data 526a to 526d are arranged in chronological order. Here, if the user swipes the touch operation surface of the smartphone GUI-1 in the direction of an arrow 531a, event-related data of events which have occurred at even later times and the corresponding thumbnails are displayed, and if the user swipes the touch operation surface of the smartphone GUI-1 in the direction of an arrow 531b, event-related data of events which have occurred at even earlier times and the corresponding thumbnails are displayed.

Further, if the user swipes the touch operation surface of the smartphone GUI-1 in the direction of an arrow 532a, event-related data related to events issued in response to opening-closing movements of the window 2 and the corresponding thumbnails are further displayed, and if the user swipes the touch operation surface of the smartphone GUI-1 in the direction of an arrow 532b, event-related data related to events issued in response to events issued in response to movement detection and the corresponding thumbnails are further displayed.

In the above-described embodiment, as described above with reference to FIGS. 3 and 5B, it is also possible to display the event-related data and the corresponding thumbnails of the plurality of events in combination. As shown in FIG. 3, the system controller 602 includes the filtering unit 631. The filtering unit 631 can filter and classify event-related data into event categories, or can combine and list event-related data of various events. FIG. 8B shows a display example of the event-related data and the thumbnails of the monitoring data of events issued in response to opening-closing movements of the door 2 and of events issued in response to sound detection.

In this case also, if the user swipes the touch operation surface of the smartphone GUI-1 in the direction of an arrow 531a, event-related data of events which have occurred at even later times and the corresponding thumbnails are displayed, and if the user swipes the touch operation surface of the smartphone GUI-1 in the direction of an arrow 531b, event-related data of events which have occurred at even earlier times and the corresponding thumbnails are displayed.

Figure 9:
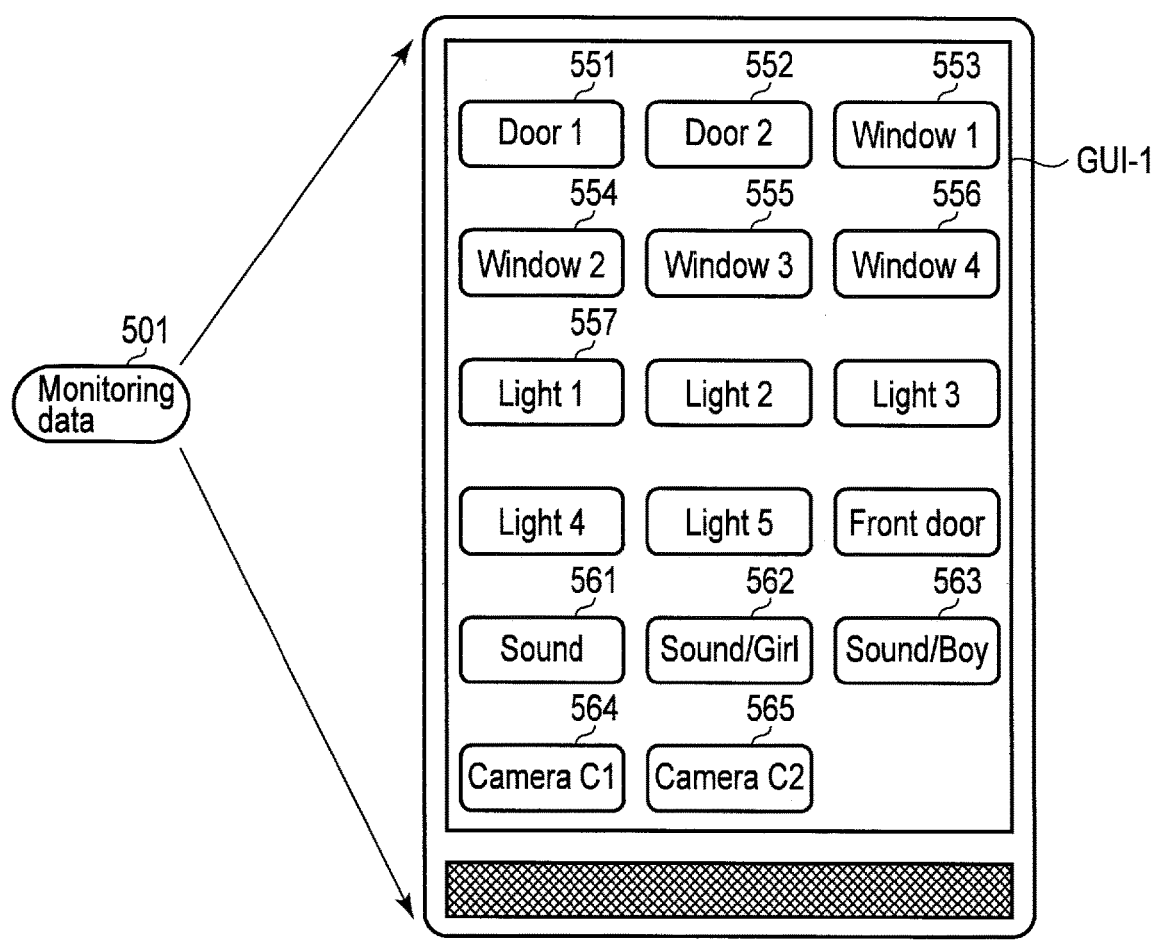
FIG. 9 is an explanatory diagram showing another example of the relationship of the smartphone to the event-related data displayed on the screen of the smartphone and the operation method of the event-related data displayed on the screen of the smartphone.

FIG. 9 is an explanatory diagram showing another example of the relationship between the smartphone and the event-related data displayed on the screen of the smartphone and the operation method of the event-related data displayed on the screen of the smartphone. In the previous display examples (FIGS. 8A and 8B), event-related data is listed. However, after the monitoring data display is touched, the reference names of event occurrence sources may be displayed in tile style as shown in FIG. 9. Further, when the user taps his/her finger on a desired tile of a plurality of tiles (door 1, door 2, window 1 to window 4, light 1 to light 5, sound 561, sound/girl 562, sound/boy 563, ... ), the display may be changed to the display shown in FIG. 6B, for example. If the sound 561 is selected, event-related data of events issued in response to all sounds will be displayed. However, if the sound/girl 562 is selected, event-related data of events issued in response to sounds of girls will be displayed, and if the sound/boy 563 is selected, event-related data of events issued in response to sounds of boys will be displayed.

FIG. 10 shows the structure of the event-related data recorded in the management area 1021 and the monitoring data recorded in the data area 1011. The event-related data is classified by event category. For example, the event categories include an opening-closing movement of a door, an opening-closing movement of a window, an on-off operation of a light, an on-off operation of an air conditioner, an on-off operation of a television receiver, movement detection, and the like. Further, each event category item includes sensor items (sensor 1, sensor 2, ... ) which are provided with sensor identification data, respectively. Still further, each sensor item includes a plurality of items of event data. The event data includes, for example, an event occurrence time, a recording start time of monitoring data, a recording end time of monitoring data, a recording start address of monitoring data, a recording end address of monitoring data, a thumbnail address, and the like. Here, the recording start address of monitoring data, the recording end address of monitoring data, and the thumbnail address all indicate addresses in the data region 1011, and the playback control unit 623 reads desired data from the recording medium 1010 with reference to these addresses.

Figure 11:
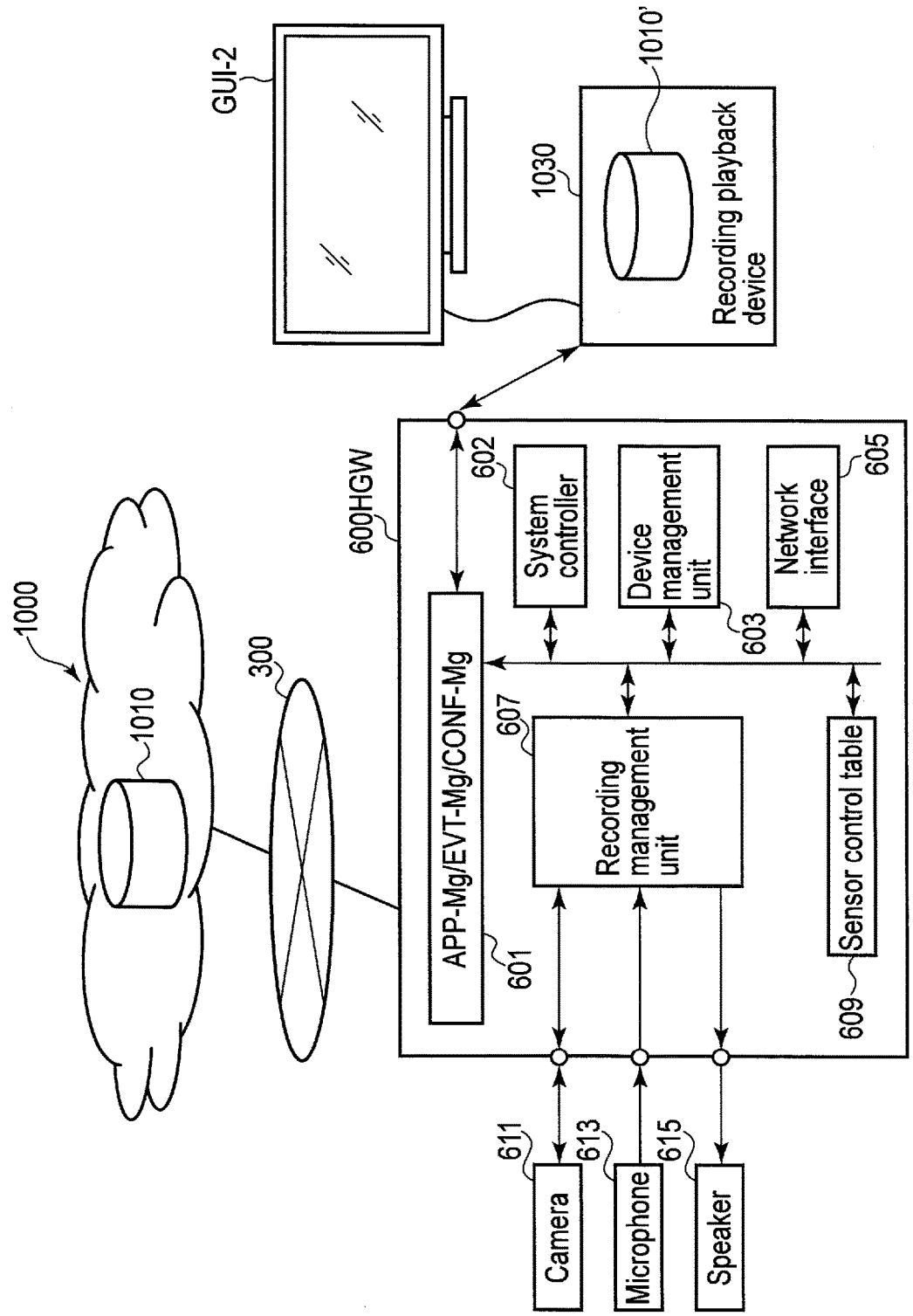
FIG. 11 is a diagram showing an example of the overall structure of a network system which adopts another embodiment.

FIG. 11 shows an embodiment comprising a recording medium 1010' in a recording playback device 1030 which is connected to the HGW 600. The recording medium 1010, which has been described with reference to FIG. 1, is provided in the server 1000 which is connected to the HGW 600 via the Internet 300. However, in the embodiment shown in FIG. 11, the recording medium 1010' is provided within the recording playback device 1030 which is connected to the HGW 600.

In the present embodiment, for example, monitoring data can be easily displayed with a high degree of definition in the television receiver GUI-2. Further, since monitoring data will not be transmitted to the outside via the Internet 300, the present embodiment is effective in the case of managing, in particular, personal monitoring data. Note that data to be transmitted to the server 1000 or data to be transmitted from the server 1000 to the HGW 600 via the Internet 300 is subjected to concealment processing.

Further, in the embodiment shown in FIG. 11, the camera 611, the microphone 613, and the speaker 615 can be connected to or disconnected from the HGW 600. That is, the camera 611, the microphone 613 and the speaker 615 can be installed at sites distant from the main body of the HGW 600 via connection lines.

Still further, as another embodiment, both the recording medium 1010 shown in FIG. 1 and the recording medium 1010' shown in FIG. 11 may be provided. In this case, the recording places for monitoring data and event-related data may be arbitrarily selected.

For example, monitoring data and event management data of events which are within the contractual coverage of a security service provider may be recorded in the recording medium 1010 of the server 1000, and monitoring data and event management data of the other events which are excluded from the contractual coverage may be recorded in the recording medium 1010' in the personal recording playback device 1030.

FIG. 12 is an example of the sensor list which is displayed on the screen of the smartphone GUI-1 when the sensor list button 507 of the smartphone GUI-1 is operated. The sensor list is managed by the display style processing unit 629.

In the sensor list, the identification names of the respective sensors used at home (for example, door 1, door 2, movement detection 1, window switch 1, . . . , and the like) are displayed. In the sensor list, a check mark shows whether or not each sensor is in operation. That is, a check mark: "V" is added to an item on the list: "On" if a sensor is incorporated into a system as an event detector, and a check mark: "V" is added to an item on the list: "Off" if a sensor is not incorporated into a system as an event detector. The user can arbitrarily set a check mark: "V". For example, the user can turn a desired sensor on or off by performing a touch operation on the corresponding item on the list.

Further, the user can arbitrarily set, when each sensor detects an event, the recording place for the event-related data of the event and the corresponding monitoring data to the external server or the household recording playback device 1030 shown in FIG. 11. According to the setting, a check mark: "V" will be displayed in an item on the list: "Server" in the case of recording in the external server 1000, while a check mark: "V" will be displayed, for example, in an item on the list: "Option" in the case of recording in the household recording playback device 1030.

FIG. 13 shows that the HGW 600 is compatible to various communication standards. There is a case where communication standards of sensors vary from sensor manufacturer to sensor manufacturer. For example, there are sensors 101*a*, 102*a*, 103*a*, 104*a*, . . . conforming to the IEEE 802.15.4 standard, sensors 101*b*, 102*b*, 103*b*, 104*b*, . . . conforming to the IEEE 802.151 standard, and sensors 101*c*, 102*c*, 103*c*, 104*c*, . . . conforming to the IEEE 802.15.3a. Further, there may be sensors conforming to the IEEE 802.11b standard, the IEEE 802.11a standard, and the IEEE 802.11g standard.

Therefore, the HGW 600 of the present embodiment comprises interfaces 605*a*, 605*b* and 605*c* as the network interfaces compatible to the respective communication standards.

Figure 14A:
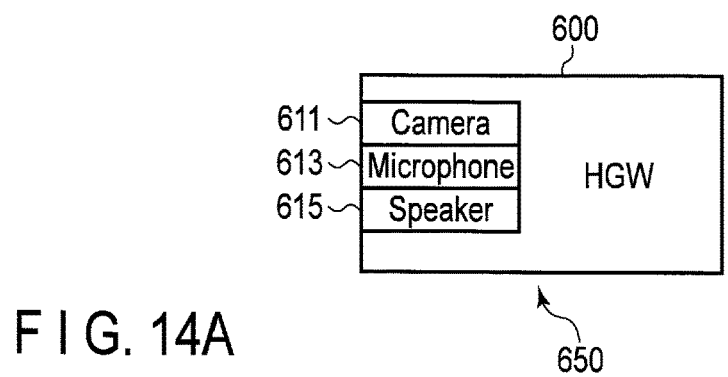
FIG. 14A is a diagram showing the first-type home gateway.
Figure 14B:
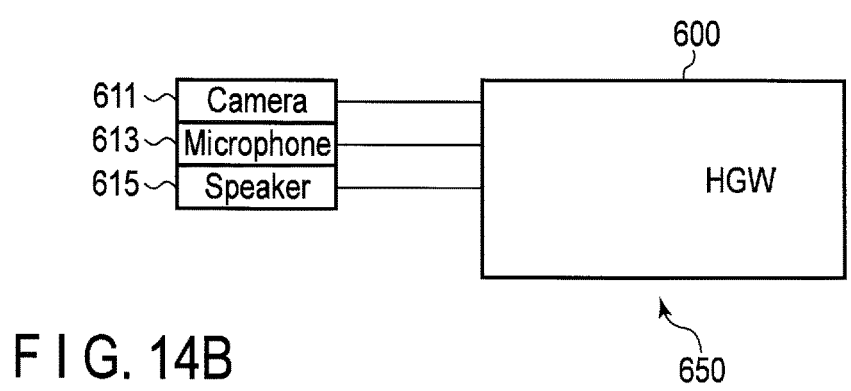
FIG. 14B is a diagram showing the second-type home gateway.
Figure 14C:
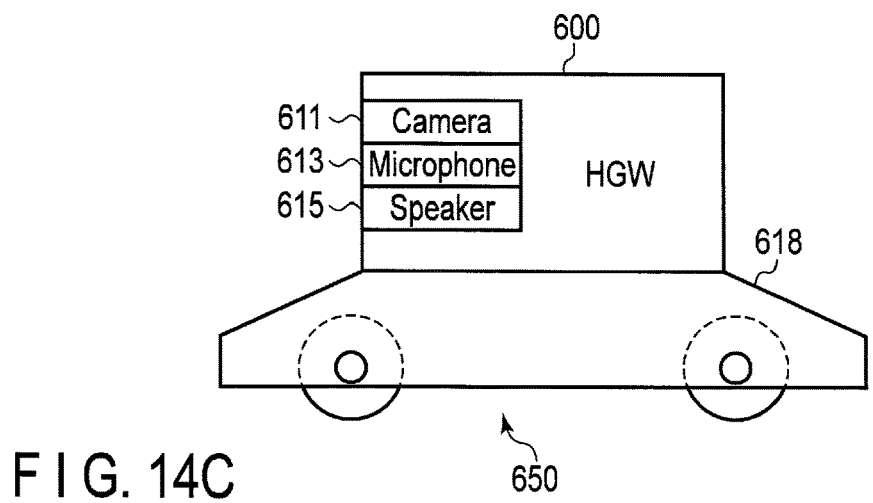
FIG. 14C is a diagram showing the third-type home gateway.

FIGS. 14A, 14B and 14C show the HGW 600 of various types. The HGW 600 includes an HGW 600 which integrally comprises the camera 611, the microphone 613, and the speaker 615 as shown in FIG. 14A, and an HGW 600 which is appropriately connectable to the camera 611, the microphone 613, and the speaker 615 as shown in FIG. 14B. Further, the HGW 600 includes an HGW 600 which integrally comprises the camera 611, the microphone 613, and the speaker 615 as shown in FIG. 14A and the HGW 600 is integrated with a traveling device 618. Note that, since the HGW 600 can take various forms as described above, the HGW 600 may also be referred to as an assistant device 605 as a whole.

FIG. 15A shows a sensor 800 as an event detector. For example, a switch 802 is provided in a substrate 801. A blade 803 is attached to one end of the substrate 801 via a hinge. For example, when a door or a window is opened, the rotating portion of the blade 803 is separated from the substrate 801, and then the switch 802 is turned on. In this way, power is supplied from a power source to a power circuit provided in the substrate 801, a radio signal transmitter in the substrate 801 is activated, and a radio signal containing a predetermined sensor ID is output. At this time, the switch 802 is turned on (that is, a door or a window is open), as the radio signal is received by the HGW 600, the HGW 600 recognizes that the door or the window is open. If the HGW 600 does not receive any radio signal containing the predetermined sensor ID, the HGW 600 recognizes that the door or the window is closed.

FIG. 15B shows a sensor 810 as another event detector. For example, a photoelectric converter (photoelectric converter panel) 812 is attached to the substrate 811. As the photoelectric converter 812 performs an output, a radio signal transmitter 813 is driven. If the photoelectric converter 812 is not irradiated with light, the photoelectric converter 812 swiftly discharges all power. Therefore, for example, if a curtain is opened or a light is turned on, a radio signal containing a sensor ID is output from the radio signal transmitter 813. In contrast, if a curtain is closed or a light is turned off, the radio signal transmitter 813 stops the operation, and the radio signal output will stop, accordingly. Therefore, the sensor 810 can be used as a sensor which detects an opening-closing movement of a curtain, an on-off operation of a light, or the like.

Further, it is also possible, by providing a color filter on the light receiving surface of the photoelectric converter 812, to configure the sensor 810 not to respond to undesirable light.

Note that, to detect an opening-closing movement of a curtain, another similar sensor, namely, a second sensor may be further provided in addition to the above-described sensor 810. Further, the second sensor turns a switch off when a curtain is closed and light is blocked by the curtain, while the second sensor turns the switch on when the curtain is opened and the second sensor is illuminated with light, and transmits a radio signal containing the ID of the second sensor for a certain period of time. In this case, if one sensor has a problem, the HGW 600 can easily determine the problem. Therefore, it is possible to enhance the detection performance of the function of detecting the opening-closing movements of the curtain in the HGW 600 system.

In the above description, one camera is provided, and video data which is recorded by the camera is mainly used as monitoring data. However, a plurality of cameras (camera 1, camera 2, camera 3, . . . ) may be provided as sensors, and a plurality of items of video data which are recorded by the plurality of cameras may be treated as monitoring data. In that case, when the user checks the monitoring data, the user may select which monitoring data of cameras to check. Further, monitoring data of a plurality of cameras may be separately displayed on the screen.

Still further, certainly, the monitoring data is not limited to a video but also includes a change in temperature/humidity and a change in pressure. Therefore, when the user checks the monitoring data, for example, the user may select which type of monitoring data to check in a manner similar to that shown in FIG. 9.

As a modification, the present invention may further comprise a means of editing monitoring data as memorial data. For example, a typical happy family life scene or the like changes with time or with the times. In a case where such scenes are recorded as monitoring data, monitoring data of a specific event can be extracted, edited, and stored as a memorial video. Therefore, memorial video storage processing can be executed with respect to particular monitoring data.

FIG. 16 shows another embodiment. In the present embodiment, the system controller 602 further comprises a function 641 of specifying a particular recorded event, a function 642 of unspecifying a particular recorded event, and a function 643 of playing a specified event. In the following, since the other function blocks are the same as those of the previous embodiment, the function blocks the same as those of the previous embodiment are denoted by the same reference number, and detailed description thereof will be omitted.

At home, for example, there is a case where a happy family life scene is seen or there is also a case where a child is born and a new family member is added to a family. For example, a happy family life scene is seen in the dining room. Therefore, in the present embodiment, the sensor list includes a particular event specification item on the list as shown in FIG. 17.

Figure 17:
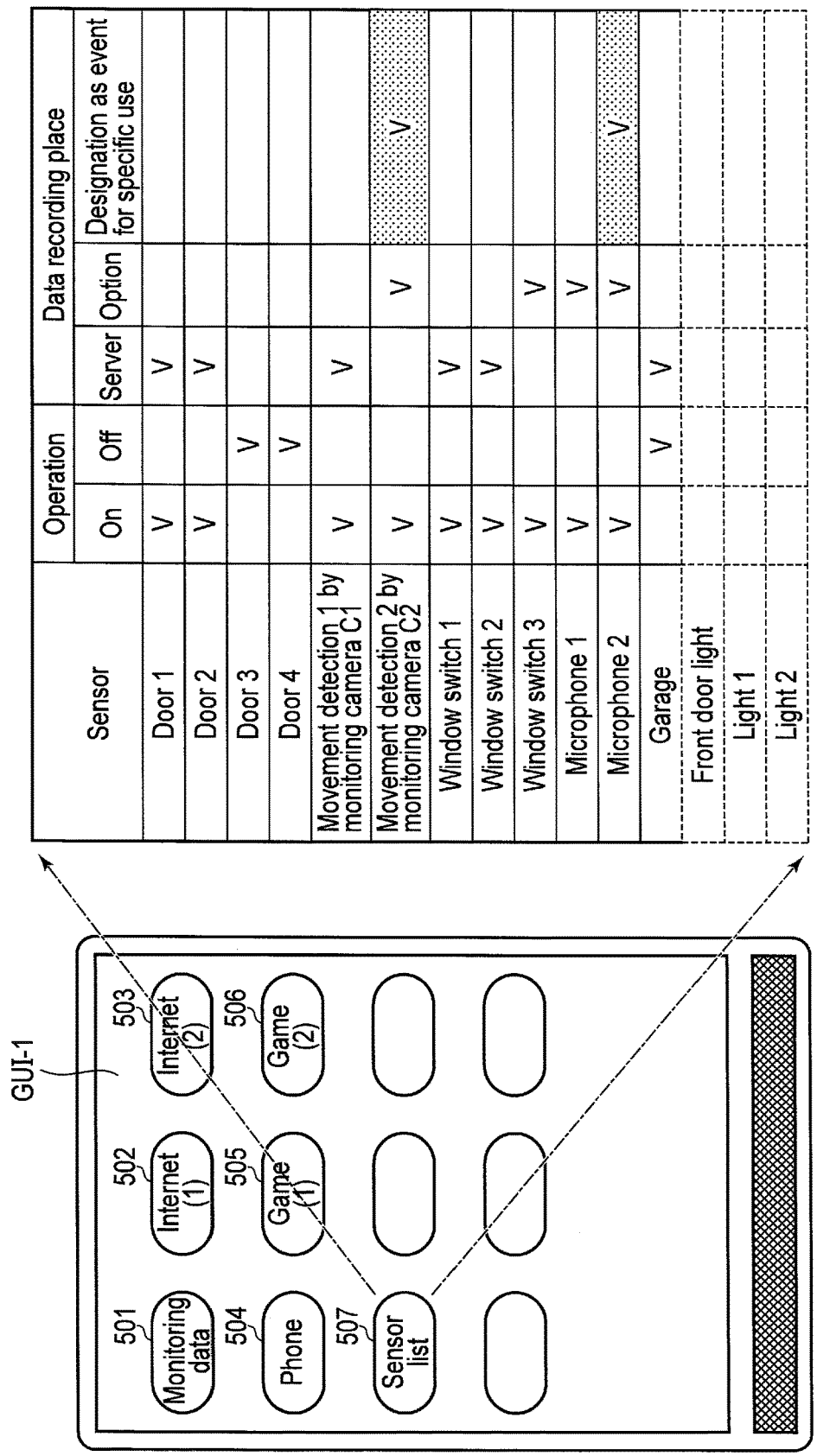
FIG. 17 is a diagram showing an example of the embodiment of FIG. 16 where a list of sensor operation modes is displayed.

In the example of FIG. 17, for example, a video to be recorded by a monitoring camera C2 which is installed in the dining room is designated as an event for specific use. If a movement is detected based on video data, the monitoring camera C2 can video a happy family life scene. Further, for example, a sound (a cry is regarded as an event) to be picked by a microphone 2 of a child's room is designated as an event for specific use. Therefore, for example, if a child is born in a family, events related to the baby can be recorded as memorial events of the baby. Still further, in each of the dining room and the child's room, the camera and the microphone may be integrally operated. In this way, both the audio data and the video data of the memorial events can be automatically recorded.

Note that the present invention is not limited to the above-described embodiments. In response to an event, the above-described system can record audio data, video data, and the like in a recording medium. Therefore, in response to an event with a high degree of importance, not only some cameras and/or microphones, but all cameras and/or microphones may be activated. In this way, the situations (videos and sounds) of the respective installation areas of all the cameras and microphones can be recorded as event data. Here, events with a high degree of importance include, for example, an opening-closing movement of a front door, an opening-closing movement of a safe, an opening-closing movement of a drawer, and the like. About the above-mentioned technical term, various expressions are possible. As for the above-mentioned technical term, those names are not necessarily limited. For example, you may exchange device (or unit) for unit (or device).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data monitoring and management device comprising:
a network interface to obtain event-related data when at least a sensor detects an event being received as input;
a data management unit to (i) control at least an operation of a camera and an operation of a microphone and (ii) send one or both of first monitoring data from the camera and second monitoring data from the microphone to a recording unit;
a system controller controlling the data management unit, wherein
the system controller includes
an instruction unit to record, in the recording unit, the event-related data of when the event is detected and the one or both of the first monitoring data and the second monitoring data of when the event occurs; and
a display data output unit including an event filtering function that receives the event-related data from the recording unit, the display data output unit plays the event-related data as display data, wherein a part of at least one of the first and second monitoring data corresponding to the event-related data.

2. The data monitoring and management device of claim 1, further comprising a playback control unit, wherein the playback control unit and the display data output unit output, when there is a specification input to the displayed event-related data or the displayed part of the one or both of the first displayed monitoring data and the second displayed monitoring data, a stream of monitoring data corresponding to the event-related data from the display data output unit.

3. The data monitoring and management device of claim 1, wherein the event-related data includes an event occurrence time when the event occurs and a type of sensor which detects the event.

4. The data monitoring and management device of claim 1, further comprising a display style processing unit, wherein the display style processing unit produces an array of the plurality of items of event-related data corresponding to the plurality of events classified by event category.

5. The data monitoring and management device of claim 1, further comprising a display style processing unit, wherein the display style processing unit filters a type of event according to an operation input and produces an array of the plurality of items of event-related data.

6. The data monitoring and management device of claim 1, wherein the instruction unit determines a user's manual input as the event.

7. The data monitoring and management device of claim 1, wherein the instruction unit determines an input from a user's portable device as the event.

8. The data monitoring and management device of claim 1, further comprising a display style processing unit, wherein the display style processing unit and the display data output unit output the plurality of items of monitoring data corresponding to the plurality of items of event-related data.

9. The data monitoring and management device of claim 1, further comprising a playback control unit and a display style processing unit, wherein the playback control unit, the display style processing unit, and the display data output unit display a list of the plurality of items of monitoring data corresponding to the plurality of items of event-related data, and when an item of monitoring data is selected from the list of the plurality of items of monitoring data, continuously plays the selected item of monitoring data for the corresponding recording time.

10. The data monitoring and management device of claim 1, further comprising a playback control unit, wherein the playback control unit continuously plays the plurality of items of monitoring data related to the plurality of events in a fast-forward mode or in an ordinary mode.

11. The data monitoring and management device of claim 1, further comprising a playback control unit, wherein the playback control unit continuously plays the plurality of items of monitoring data related to the specified event in a fast-forward mode or in an ordinary mode.

12. The data monitoring and management device of claim 1, further comprising an event processing unit which processes the plurality of items of event-related data, wherein the event processing unit integrates the plurality of items of event-related data corresponding to the specified events.

13. The data monitoring and management device of claim 1, wherein the instruction unit comprises a memory which caches the monitoring data, and when the event occurs, the instruction unit specifies as the monitoring data to be recorded in the memory, the monitoring data which has been recorded from at least a certain time before the event occurrence time to a certain time after the event occurrence time.

14. An event data monitoring method of a data monitoring and management device comprising a network interface to receive event-related data obtained when at least one of a plurality of sensors detects an event, a data management unit to control at least an operation of a camera and an operation of a microphone and send one or both of first monitoring data from the camera and second monitoring data from the microphone to a recording unit, and a system controller to control the data management unit, the event data monitoring method comprising:

recording in the recording unit, event-related data of when the event is detected and the one or both of the first monitoring data and the second monitoring data of when the event has occurred, and filtering the event-related data outputting from the recording unit, and playing the filtered event-related data as display data, wherein a part of the at least one of the first monitoring data and the second monitoring data corresponding to the event-related data.

15. The data monitoring management device of claim 1, wherein each of the plurality of sensors is a type of sensor which detects an opening-closing movement of a window or an opening-closing movement of a door or detects a certain sound.

16. The data monitoring management device of claim 1, wherein each of the plurality of sensors is a type of sensor which includes a photoelectric converter.

17. The data monitoring management device of claim 1, wherein the camera and the microphone are located at a distance from a home gateway which includes the data management unit.

18. The data monitoring management device of claim 1, wherein the camera and the microphone are integrated into a home gateway which includes the data management unit.

19. The data monitoring management device of claim 1, further comprising a sensor control table, wherein the sensor control table stores names of a plurality of registered sensors, information on positions of the sensors, and data for controlling the sensors, and the names of the sensors and the information on the positions of the sensors are displayed on a user's portable device.

20. The data monitoring management device of claim 1, wherein the recording unit is installed in (i) a home gateway which includes the data management unit or (ii) a server.

* * * * *